(12) United States Patent
Yang et al.

(10) Patent No.: US 10,779,223 B2
(45) Date of Patent: Sep. 15, 2020

(54) PRIORITY AND BROADCASTING IN A NETWORK SERVING LTE, EMTC, AND NB-IOT

(71) Applicant: Verizon Patent and Licensing Inc., Arlington, VA (US)

(72) Inventors: Jin Yang, Orinda, CA (US); Jignesh S. Panchal, Hillsborough, NJ (US); Zheng Zhao, Plainsboro, NJ (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 15/235,305

(22) Filed: Aug. 12, 2016

(65) Prior Publication Data

US 2018/0049108 A1 Feb. 15, 2018

(51) Int. Cl.
| | |
|---|---|
| *H04W 48/16* | (2009.01) |
| *H04W 24/08* | (2009.01) |
| *H04W 4/70* | (2018.01) |
| *H04W 48/00* | (2009.01) |
| *H04L 12/851* | (2013.01) |
| *H04W 48/06* | (2009.01) |
| *H04L 12/859* | (2013.01) |
| *H04L 12/803* | (2013.01) |
| *H04W 28/02* | (2009.01) |
| *H04W 4/06* | (2009.01) |
| *H04W 88/10* | (2009.01) |

(52) U.S. Cl.
CPC .......... *H04W 48/16* (2013.01); *H04L 47/125* (2013.01); *H04L 47/2433* (2013.01); *H04L 47/2475* (2013.01); *H04W 4/70* (2018.02); *H04W 24/08* (2013.01); *H04W 28/0284* (2013.01); *H04W 48/00* (2013.01); *H04W 48/06* (2013.01); *H04W 4/06* (2013.01); *H04W 88/10* (2013.01)

(58) Field of Classification Search
CPC ....... H04W 48/16; H04W 48/00; H04W 4/70; H04W 4/06; H04W 24/08
See application file for complete search history.

(56) References Cited

U.S. PATENT DOCUMENTS

| | | | |
|---|---|---|---|
| 2009/0104907 A1* | 4/2009 | Otting .................. | H04W 48/10 455/435.3 |
| 2011/0244874 A1* | 10/2011 | Fodor .................. | H04W 48/18 455/450 |
| 2015/0334724 A1 | 11/2015 | Faccin et al. | |
| 2016/0088542 A1 | 3/2016 | Belghoul et al. | |
| 2017/0332357 A1* | 11/2017 | Xu .......................... | H04W 4/70 |

* cited by examiner

*Primary Examiner* — Ricky Q Ngo
*Assistant Examiner* — Stephen N Steiner

(57) ABSTRACT

A method, a device, and a non-transitory storage medium provide to estimate a load for each access mode of multiple access modes of a wireless station, wherein the access modes include a first mode and one or more other modes; calculate a loading metric for each access mode based on its corresponding load in response to the estimation; calculate an order of priority for each access mode by which one or more end devices are to use to connect to the wireless station, based on the loading metric of each access mode; generate a first message that includes the order of priority; and broadcast the first message within a cell of the wireless station.

20 Claims, 22 Drawing Sheets

PRIORITY AND BROADCASTING IN A NETWORK SERVING LTE, EMTC, AND NB-IOT

BACKGROUND

As the standardization of radio access technologies continues, deployment and operational considerations of such technologies naturally follow. For example, the Third Generation Partnership Project (3GPP) is underway in developing standards for NarrowBand Internet of Things (NB-IoT) (also known as Cat-M2).

DETAILED DESCRIPTION OF PREFERRED EMBODIMENTS

Figure 1:
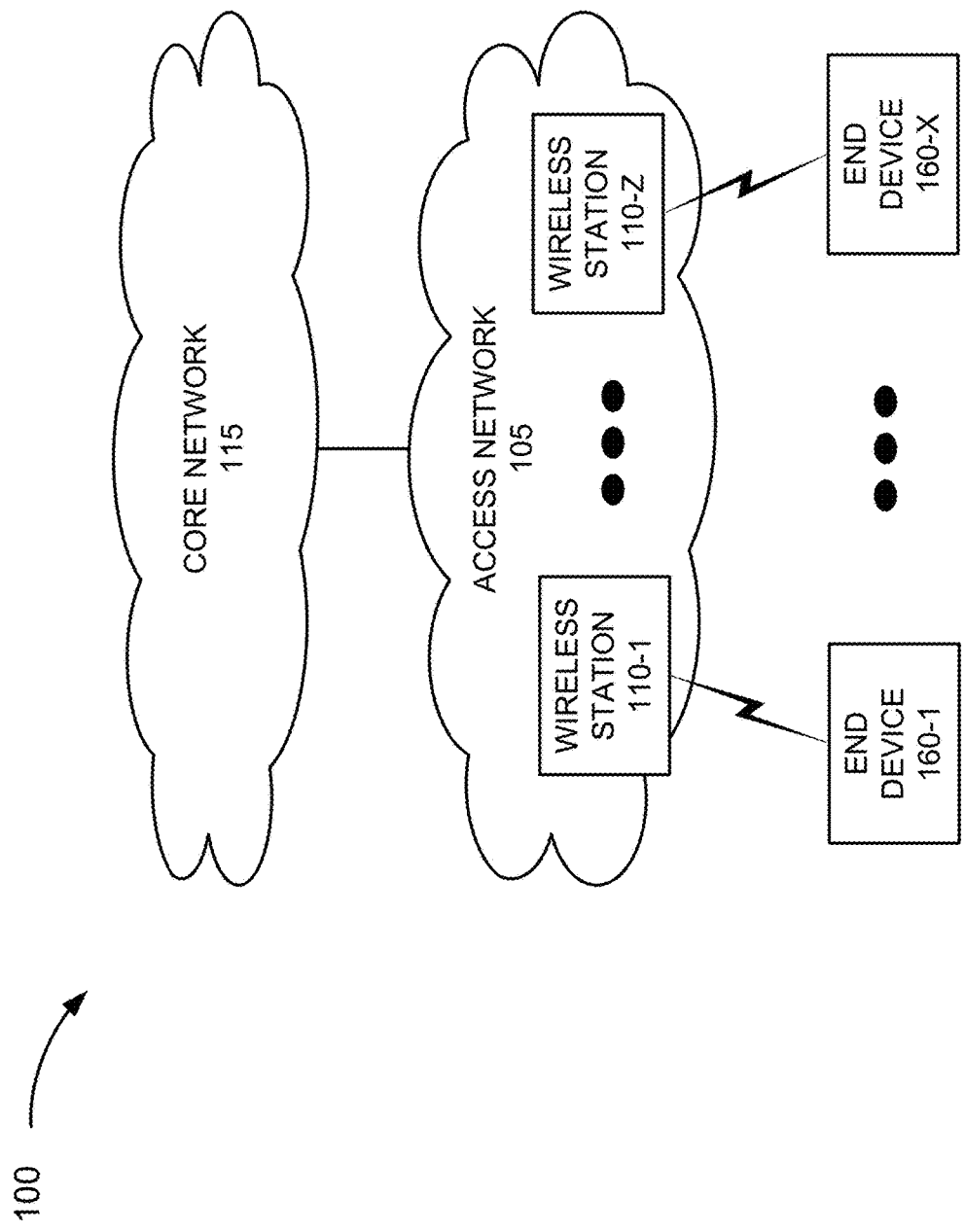
FIG. 1 is a diagram illustrating an exemplary environment in which an exemplary embodiment of an access service may be implemented.

The following detailed description refers to the accompanying drawings. The same reference numbers in different drawings may identify the same or similar elements. Also, the following detailed description does not limit the invention.

Efficient use of resources in a wireless network is essential to support the continuing increase in demand by end devices. For example, given the ever-increasing number of end devices and various radio technologies that are emerging, such as NB-IoT and enhanced Machine Type Communication (eMTC) (also known as Cat-M1), as well as existing radio technologies, such as Long Term Evolution (LTE), LTE-Advanced (LTE-A), etc., radio resources need to be preserved. Additionally, from a network-side perspective, each radio technology is treated independently as a separate system in terms of radio access, etc., due to each end device controlling its own access to the wireless network. However, an end device may operate in multiple modes or support multiple radio technologies. For example, an LTE device may support both eMTC and NB-IoT technologies. Additionally, an eMTC device may also support NB-IoT. In view of these considerations, allowing each end device to control its own mode of access instead of the wireless network may not yield the best results in terms of resource use and management, connectivity, etc.

According to an exemplary embodiment, an access service of a wireless network is provided. According to an exemplary embodiment, the access service calculates an order of priority for access modes by which an end device uses to connect to and/or communicate information via the wireless network. According to an exemplary implementation, the order of priority is calculated based on end device coverage information and data rate information.

The end device coverage information may indicate a type of coverage afforded by an access mode. For example, end device coverage information may indicate a normal LTE coverage when the end device operates in an LTE mode, of about a 5-10 dB coverage extension when the end device operates in an eMTC mode A, about a 10-15 dB coverage extension when the end device operates in an eMTC mode B, and about a 15-24 dB coverage extension when the end device operates in an NB-IoT mode. According to other examples, the decibel ranges and/or the modes may be different.

The data rate information may indicate a data rate afforded by an access mode. For example, when the end device operates in an LTE mode, the end device may be afforded an LTE data rate (e.g., Cat 1, 3/4 and above, etc.), in an eMTC mode A mode, the end device may be afforded a medium data rate (e.g., up to about 1 Megabits per second (Mbps)), in an eMTC mode B mode, the end device may be afforded a low data rate (e.g., up to about 200 Kilobits per second (Kbps)), and in an NB-IoT mode, the end device may be afforded an ultra-low data rate (e.g., up to about 50 Kbps). According to other examples, the levels (e.g., medium, low, etc.), the modes, and/or the data rates may be different.

According to other exemplary implementations, the order of priority is calculated based on other types of information, such as quality of service (QoS) requirements (e.g., delay tolerance, bit error rate, etc.), wireless network considerations (e.g., load balancing, resource utilization factors, etc.).

According to an exemplary embodiment, the wireless network broadcasts access information, which includes the order of priority for access modes, to end devices. According to an exemplary embodiment, the access information is included in a system information block (SIB) message. According to an exemplary implementation, the SIB message is a SIB Type 1. For example, the access information may be included in a freqBandIndicator Information Element (IE). By way of further example, the freqBandIndicator IE includes a multiBandInfoList IE that lists frequency bands supported by the radio access network (RAN) of the wireless network. According to an exemplary implementation, the access information includes new E-UTRA Absolute Radio Frequency Channels (EARFCNs) provided for eMTC and NB-IoT. For example, LTE EARFCNs, eMTC EARFCN(s), and NB-IoT EARFCN(s) may be listed in the multiBandInfoList IE according to a preferred order of priority.

According to another exemplary embodiment, the wireless network broadcasts access information, which includes the order of priority for access modes, to end devices in other types of SIB messages. According to an exemplary implementation, the access information may be included in all SIB Types messages, especially SIB Types 4, 5, 6, or 7. For example, eMTC and NB-IoT may each be considered as a new LTE channel that can be used during a cell reselection procedure. LTE cell reselection uses priority-based levels (e.g., 0-7). According to such an implementation, eMTC channel(s) and NB-IoT channel(s) may be assigned a level of priority corresponding to the preferred order of priority.

According to yet another exemplary embodiment, the wireless network unicasts access information to the end device. According to an exemplary implementation, the access information may be included in a Radio Resource Control (RRC) message. For example, the RRC message may be implemented as an RRC Connection Release message that contains the priority of each access technology specific to the end device.

According to still another exemplary embodiment, the access information may be provided to end devices using another radio access technology (RAT). For example, the access information may be inherited from another RAT.

According to an exemplary embodiment, an access service of an end device is provided. According to an exemplary embodiment, the access service calculates an order of priority for access modes by which the end device uses to connect to and/or communicate information via the wireless network. According to an exemplary implementation, the order of priority is calculated based on end device capability information, radio frequency (RF) condition, application information that indicates characteristics of the data to be transmitted, and the access information from the wireless network.

The end device capability information correlates an access mode (e.g., LTE, eMTC, NB-IoT), in which the end device is capable of operating, with an application data rate and a coverage extension. The RF condition may include various signal strength and/or quality measurements. For example, the RF condition may be implemented to include a Reference Signal Receive Power (RSRP), a Received Signal Strength Indicator (RSSI), a Reference Signal Received Quality (RSRQ), or the like.

According to an exemplary embodiment, the end device calculates a real-time access order value $R_k$ for each access mode in which the end device is capable of operating based on a fitness value $A_k$, a historical value $H_k$, and a priority value $P_k$. The end device searches and selects a cell to connect with based on the calculated real-time access order values $R_k$. For example, the end device performs a cell search based on the access mode that has the highest order value $R_k$.

In view of the foregoing, the access service allows the wireless network to manage multiple access modes of end devices and their access to the wireless network. For example, in a ternary system that includes an LTE mode, an eMTC (mode A and mode B), and an NB-IoT mode, a wireless station of a RAN may load balance resources based on the order of priority for access modes. For example, when resources allocated for LTE devices are heavily loaded, the wireless station may reduce the number of eMTC and/or NB-IoT inband channels or redirect LTE devices to operate in a different access mode that offers a lower data rate (e.g., eMTC, NB-IoT). Alternatively, when resources allocated for eMTC devices are heavily loaded, the wireless station may set up additional eMTC channels, reduce the number of NB-IoT channels, and/or redirect/reassign eMTC devices to operate in a different access mode that offers a lower data rate (e.g., NB-IoT). Further, when resources allocated for NB-IoT devices are heavily loaded, the wireless station may set up additional NB-IoT channels and/or redirect/reassign end devices with eMTC capabilities, which are not exposed to extreme RF conditions, to eMTC channels.

The access service also allows the wireless network to provide a coverage-based allocation of resources corresponding to the access modes of the wireless station and/or the end devices. For example, the wireless station may prioritize the NB-IoT mode for extreme coverage extension cases, the eMTC modes A/B for moderate to deep coverage extension cases, and the LTE mode for normal coverage cases.

FIG. 1 is a diagram illustrating an exemplary environment 100 in which an exemplary embodiment of an access service may be implemented. As illustrated, environment 100 includes an access network 105. Access network 105 includes wireless stations 110-1 through 110-Z (also referred to collectively as wireless stations 110 and, individually or generally as wireless station 110). Environment 100 further includes a core network 115. Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Access network 105 includes one or multiple networks of one or multiple types. For example, access network 105 may be implemented to include a terrestrial network and/or a satellite network. According to an exemplary implementation, access network 105 includes a RAN. For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of an LTE network or LTE-A network, a U-TRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

Wireless station 110 includes a network device that has computational and wireless communicative capabilities. Wireless station 110 may be implemented as a base station (BS), a base transceiver station (BTS), a Node B, an evolved Node B (eNB), a remote radio head (RRH), an RRH and a baseband unit (BBU), a BBU, or other type of wireless node (e.g., a picocell node, a femtocell node, a microcell node, etc.) that provides wireless access to access network 105.

According to an exemplary embodiment, wireless station 110 includes logic that provides the access service, as described herein. According to an exemplary embodiment, wireless station 110 operates according multiple access modes. According to an exemplary implementation, wireless station 110 operates according to an LTE mode, an eMTC mode A mode, an eMTC mode B mode, and an NB-IoT mode. According to other exemplary implementations, wireless station 110 operates according to additional, fewer, and/or different access modes. The frequency bands, sub-bands, and/or carrier frequencies in relation to the access modes may be configured by an administrator of the wireless network. For example, LTE may operate in various widebands (e.g., 13, 2, 4, etc.) depending on geographic area, carrier, etc. Additionally, for example, eMTC may operate in one or several 1.4 Megahertz (MHz) sub-bands of the LTE wideband, which may include hopping. Additionally, for example, NB-IoT may operate in a region of the LTE wideband (e.g., in the middle 2.8 MHz sub-band of the LTE band) or in one or several narrowbands or NB-IoT carrier frequencies of the eMTC sub-bands.

Core network 115 includes one or multiple networks of one or multiple types. For example, core network 115 may be implemented to include a terrestrial network and/or a satellite network. According to an exemplary implementation, core network 115 includes a complimentary network pertaining to the one or multiple RANs described. For example, core network 115 may include the core part of an LTE network, an LTE-A network, a CDMA network, a GSM network, and so forth. Depending on the implementation, core network 115 may include various network elements, such as a gateway, a support node, a serving node, a mobility management entity (MME), a router, a switch, a bridge, as well other network elements pertaining to various network-related functions, such as billing, security, authentication and authorization, network polices, subscriber profiles, and/or other network elements that facilitate the operation of core network 115.

End device 160 includes a device that has computational and wireless communicative capabilities. End device 160 may be implemented as a mobile device, a portable device, or a stationary device. End device 160 may be implemented as an MTC device, an IoT device, a machine-to-machine (M2M) device, or an end user device. For example, the end user device may be implemented as a smartphone, a personal digital assistant, a tablet, a netbook, a phablet, a wearable device, a set top box, an infotainment system in a vehicle, a game system, a music playing system, or some other type of wireless device.

According to an exemplary embodiment, end device 160 includes logic that provides the access service. According to an exemplary embodiment, end device 160 operates according to one or multiple access modes. According to an exemplary implementation, end device 160 operates according to an LTE mode, an eMTC mode A mode, an eMTC mode B mode, and/or an NB-IoT mode. As previously described, each access mode may afford end device 160 a data rate within a certain range. Additionally, as previously described, each access mode may afford end device 160 a range of coverage. For example, the eMTC mode may provide a coverage extension up to about 15 dB or up to about 155 dB maximum coupling loss (MCL) (155 dB=140 dB+15 dB) in which 140 dB is the MCL for traditional LTE coverage. The NB-IoT mode may provide coverage extension up to about 24 dB or about 164 dB MCL (e.g., 164 dB=140 dB+24 dB). In LTE mode, eMTC modes, and NB-IoT mode, end device 160 may operate within various frequency bands, sub-bands, narrow bands, and carrier frequencies attributable to the access modes.

FIGS. 2A-2G are diagrams illustrating an exemplary process of the access service from a network-side perspective. In FIGS. 2A-2G, assume that access network 105 is implemented as an E-UTRAN of an LTE or LTE-A network, and that wireless station 110 is implemented as an eNB 210. As further illustrated, eNB 210 services a cell 215, which indicates a geographic area that includes end devices 160-1 through 160-Z. According to other implementations, a single eNB 210 may service more than one cell 215. For example, cell 215 may be defined based on the radio frequency. In this regard, eNB 210 may be provisioned with multiple and different radio frequencies and correspondingly service multiple and different cells 215. Assume that one or more of end devices 160 are capable of operating in more than one access mode (e.g., LTE mode, eMTC mode A, etc.). Also assume that core network 115 is implemented as an Evolved Packet Core (EPC) that includes an MME 202. The number of eNBs and cells are exemplary.

Figure 2A:
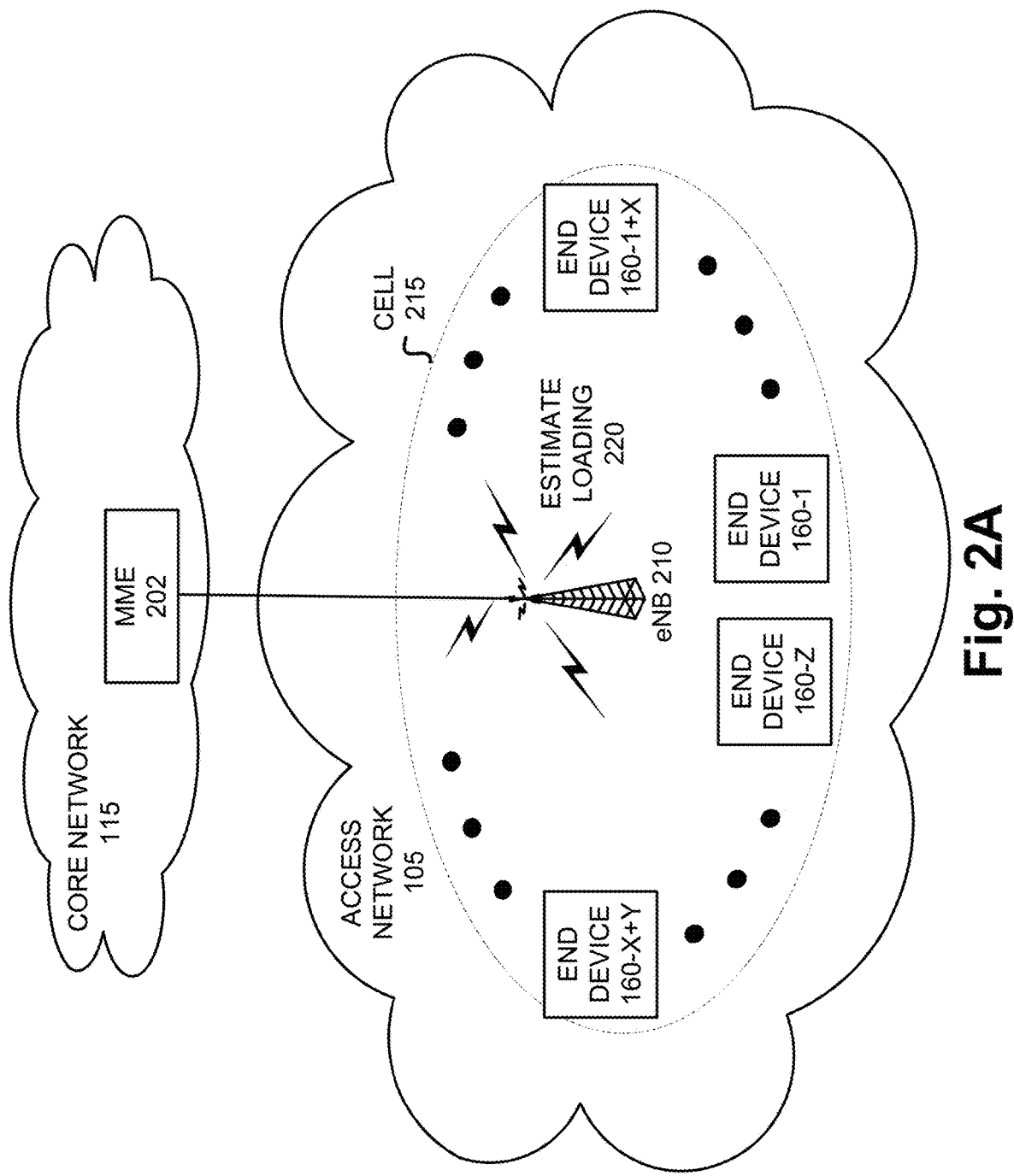
FIGS. 2A-2G are diagrams illustrating an exemplary process of the access service from a network-side perspective.

Referring to FIG. 2A, according to an exemplary scenario, eNB 210 estimates a current load 220 for each access mode of eNB 210. According to an exemplary implementation, eNB 210 includes logic that provides a resource monitoring service. The resource monitoring service monitors the resource utilization that occurs over time at eNB 210. The Radio Resource Management (RRM) logic of eNB 210 may be a part of the logic that supports the resource monitoring service. eNB 210 may also include other existing, conventional, well-known, or proprietary resource monitoring technologies to monitor resource utilization and estimate a current load. For example, eNB 210 estimates the load for the LTE mode, the eMTC mode A mode, the eMTC mode B mode, and the NB-IoT mode. The load of a cell may be measured in terms of usage of various resources relative to their limits or capacities. For example, these various resources may include radio resource usage, Physical Resource Block (PRB) usage, transmit/receive powers usage, throughput in the uplink/downlink directions, uplink/downlink Guaranteed Bit Rates (GBRs) usage, and/or uplink/downlink non-GBRs usage. eNB 210 may include additional logic to measure other types of resource usages, such a hardware load indicator, an S1 Transport Network Load indicator, a cell capacity value, etc., as well as other measurements, criteria, values, indicators, etc. (e.g., Almost Blank Subframe (ABS) information, handover failure rate, inter-cell interference, etc.), pertaining to cell and wireless network operability (e.g., load balancing, (enhanced) inter-cell interference coordination (ICIC), handover (e.g., intra-radio access technology (RAT), inter-RAT), etc.). The current load may pertain to the load associated with end devices 160 in active mode.

According to an exemplary embodiment, eNB 210 attributes the estimated load to a given access mode. Depending on the implementation of eNB 210, eNB 210 may have physical resources (e.g., hardware, software, etc.) to support a particular access mode or, alternatively, physical resources may be shared among multiple access modes. eNB 210 may obtain and evaluate resource utilization data and derived data (e.g., execution statistics data, etc.) to determine the access mode. For example, eNB 210 may count the percentage of PRB usages for each access mode. By way of further example, if eNB 210 allocates 5 PRBs for NB-IoT (i.e., 5 NB-IoT channels), and for the past 10 seconds, an average of 4.5 PRBs are used, then the loading for NB-IoT is 90%. eNB 210 may also monitor other metrics to decide loading, such as, for example, the drop call rate, packet error rate, packet delay, handover statistics, and/or other metrics.

Figure 2B:
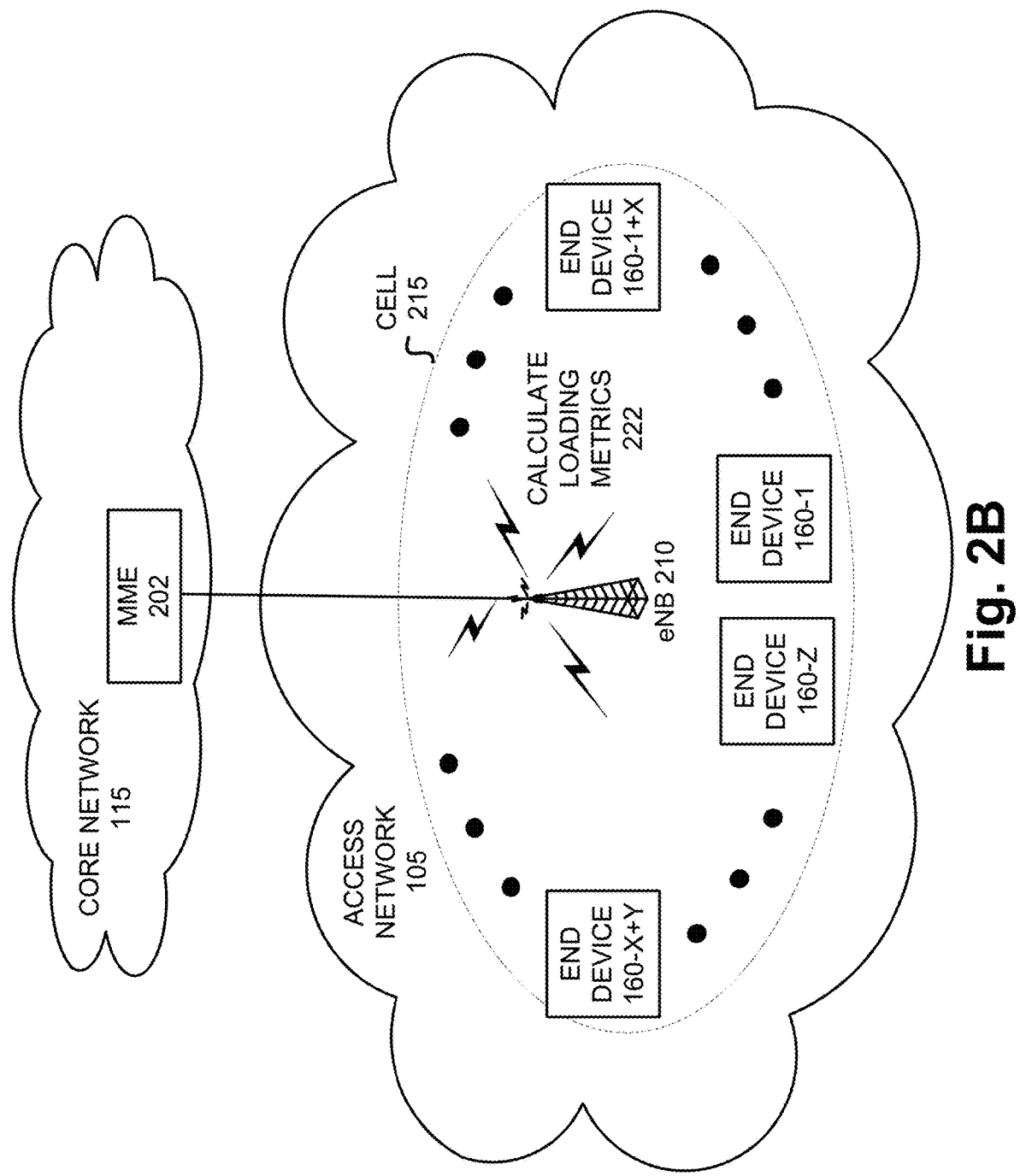

Referring to FIG. 2B, eNB 210 calculates a loading metrics 222 based on the current loads for each mode of access. For example, according to an exemplary implementation, eNB 210 includes logic to calculate, for each mode of access, a ratio between the current load and a nominal load (e.g., a target load, an optimal load, etc.). According to other exemplary implementations, the loading metric for each mode of access may be calculated based on other well-known or proprietary methods pertaining to load balancing.

Figure 2C:
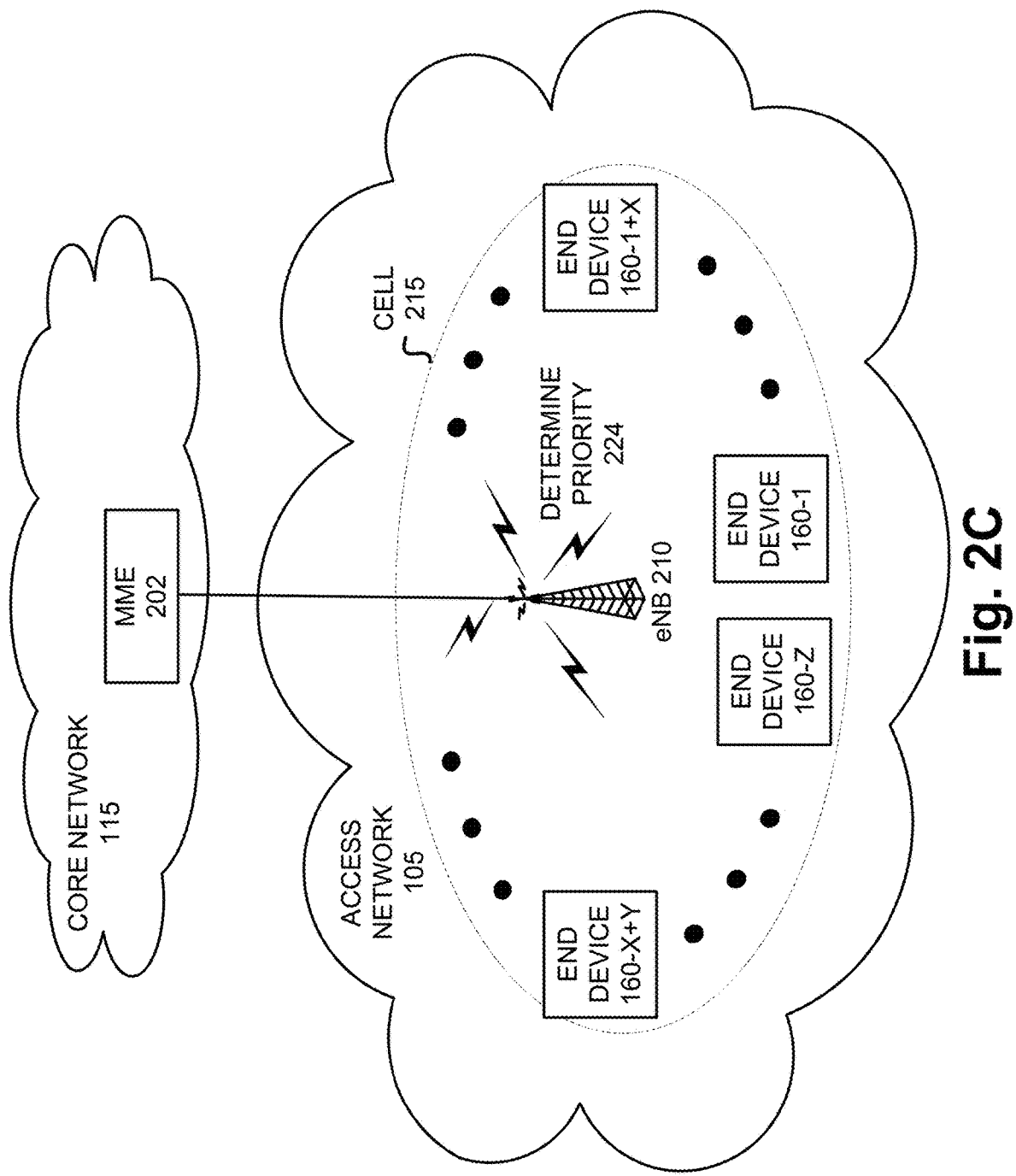
Figure 2D:
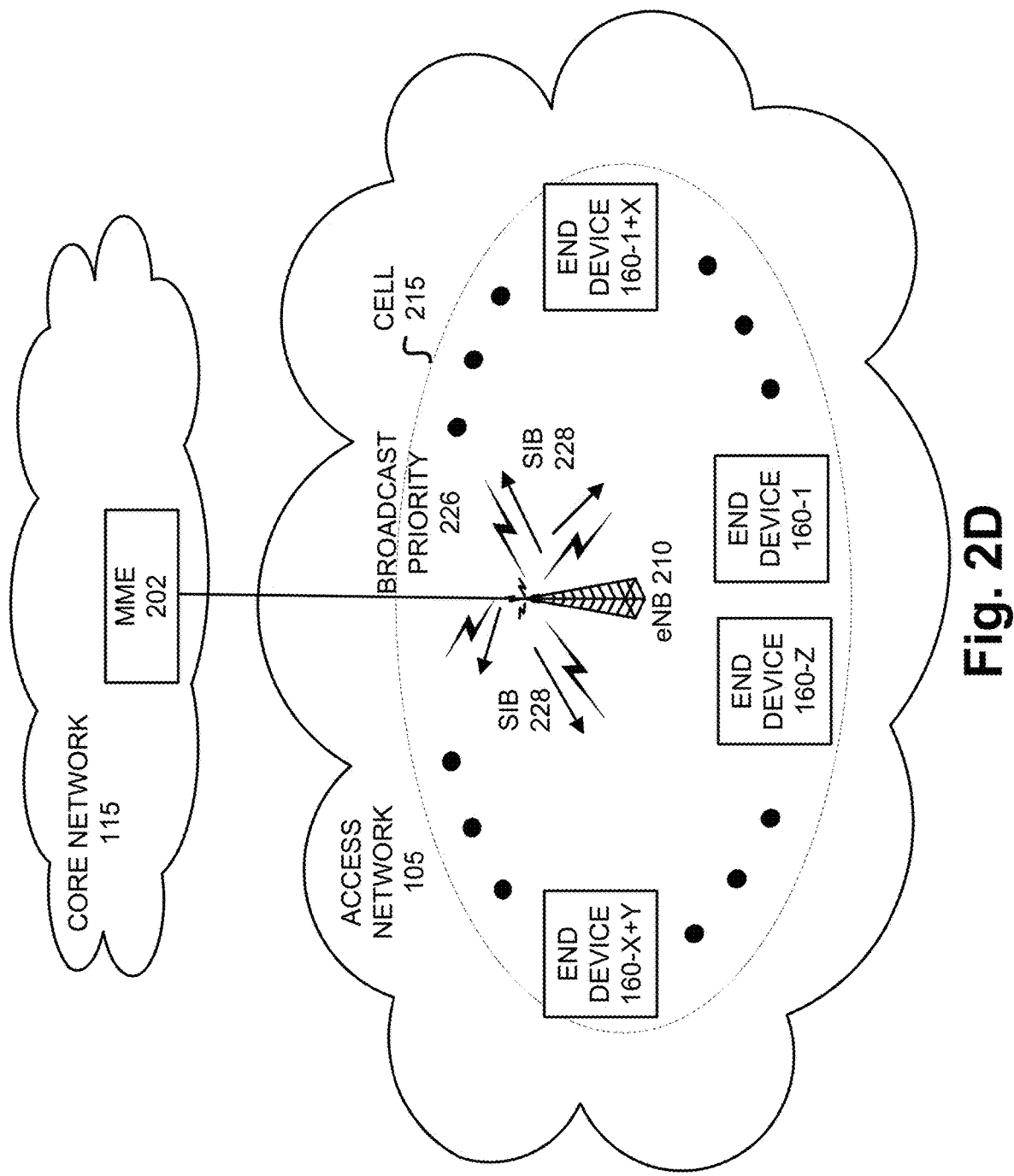

Referring to FIG. 2C, eNB 210 determines an order of priority 224 for mode access based on the calculated loading metrics. For example, eNB 210 sorts the mode of access from highest priority to lowest priority in correspondence to the lowest ratio (e.g., the least loaded mode of access) to the highest ratio (e.g., the most loaded mode of access). Referring to FIG. 2D, eNB 210 broadcasts the order of priority 226 for mode access available to end devices 160 based on the determined order. According to an exemplary implementation, eNB 210 broadcasts the priority of access modes in a SIB message 228. For example, access information that indicates the order of priority may be included in a SIB Type 1, such as in a multiBandInfoList IE. An exemplary table is illustrated below.

TABLE 1

| E-UTRA Operating Band | Uplink operating band | Downlink operating band | Duplex Mode |
|---|---|---|---|
| 13 | 777 MHz-787 MHz | 746 MHz-756 MHz | FDD |
| . . . | . . . | . . . | . . . |
| eMTC mode A | 1.4 MHz bands in Band 13 | 1.4 MHz bands in Band 13 | FDD |
| eMTC mode B | 1.4 MHz bands in Band 13 | 1.4 MHz bands in Band 13 | FDD |
| NB-IoT | 200 KHz bands in eMTC bands | 200 KHz bands in eMTC bands | FDD |

According to the example illustrated in Table 1, the preferred order of mode access may be interpreted as LTE (e.g., operating band 13), eMTC mode A, eMTC mode B, and NB-IoT (e.g., a decreasing order of priority). According to other examples, the order of priority may be conveyed in an increasing order. Frequency Division Duplex (FDD) indicates a particular type of duplex scheme available in LTE and LTE-A, it is to be understood that other types of duplexing schemes are possible. The values in Table 1 are exemplary.

According to other exemplary implementations, eNB 210 broadcasts the priority of access modes in a SIB message other than a Type 1. For example, access information that indicates the order of priority may be included in a SIB Type 4, Type 5, Type 6, or Type 7 message or other message formats. For example, SIB Type 4 includes intra-frequency cell reselection information, SIB Type 5 includes inter-frequency cell reselection information, SIB Type 6 includes inter-RAT cell reselection information, and SIB Type 7 includes inter-RAT cell reselection information. These SIB Types may be modified to carry an additional IE that includes the access information. Additionally, or alternatively, an existing IE of the SIB message may be modified to indicate the order of priority, which may be used by end device 160 to perform a cell reselection procedure. By way of example, a SIB Type 5 message includes an InterFreq-CarrierFreqInfo IE that indicates up to 8 carrier frequencies that can be used for cell-reselection. This IE may be used to indicate eMTC and NB-IoT frequencies that have been configured and operable within the wireless network. Additionally, the SIB Type 5 message includes a cellReselectionPriority IE that indicates the priority of the frequency layer. Thus, this IE may be used to indicate a priority for eMTC and NB-IoT frequencies. Similarly, a SIB Type 6 message includes a carrierFreqListUTRA_FDD/TDD IE that indicates up to 16 instances of RF carriers for FDD and Time Division Duplex (TDD) and a cellReselectionPriority IE that indicates priority of the UMTS between the values of 0-7, as previously described. Thus, these IEs may be used to carry the access information. A SIB Type 7 message also includes a carrierFreqsInfoList[0] IE and a cellReselectionPriority IE. Accordingly, these IEs may also be used to carry the access information.

According to another exemplary embodiment, eNB 210 may not broadcast the access information but, instead, eNB 210 may unicast the access information to a particular end device 160. According to an exemplary implementation, the access information may be included in an RRC message. For example, the RRC message may be implemented as an RRC Connection Release message. Typically, the RRC Connection Release message includes an IdleModeMobilityControlInfo IE that indicates cell reselection priorities. This IE may be used to carry the priority of mode access as illustrated below in the exemplary RRC message. The values are exemplary.

```
DL-DCCH Message
    rrcConnectionRelease[0] DL-DCCH Message =
    ...
        idleModeMobilityControlInfo =
            freqPriorityListEUTRA (1) = SEQUENCE of
        FreqPriorityEUTRA
            FreqPriorityEUTRA (1) =
                carrierFreq = 3100
                cellReselectionPriority = 4
            FreqPriorititytEUTRA (2) =
                carrierFreq = 3425
                cellReselectionPriority = 1
            FreqPriorititytEUTRA (3) =
                carrierFreq = 2775
                cellReselectionPriority = 3
            ...
```

Figure 2E:
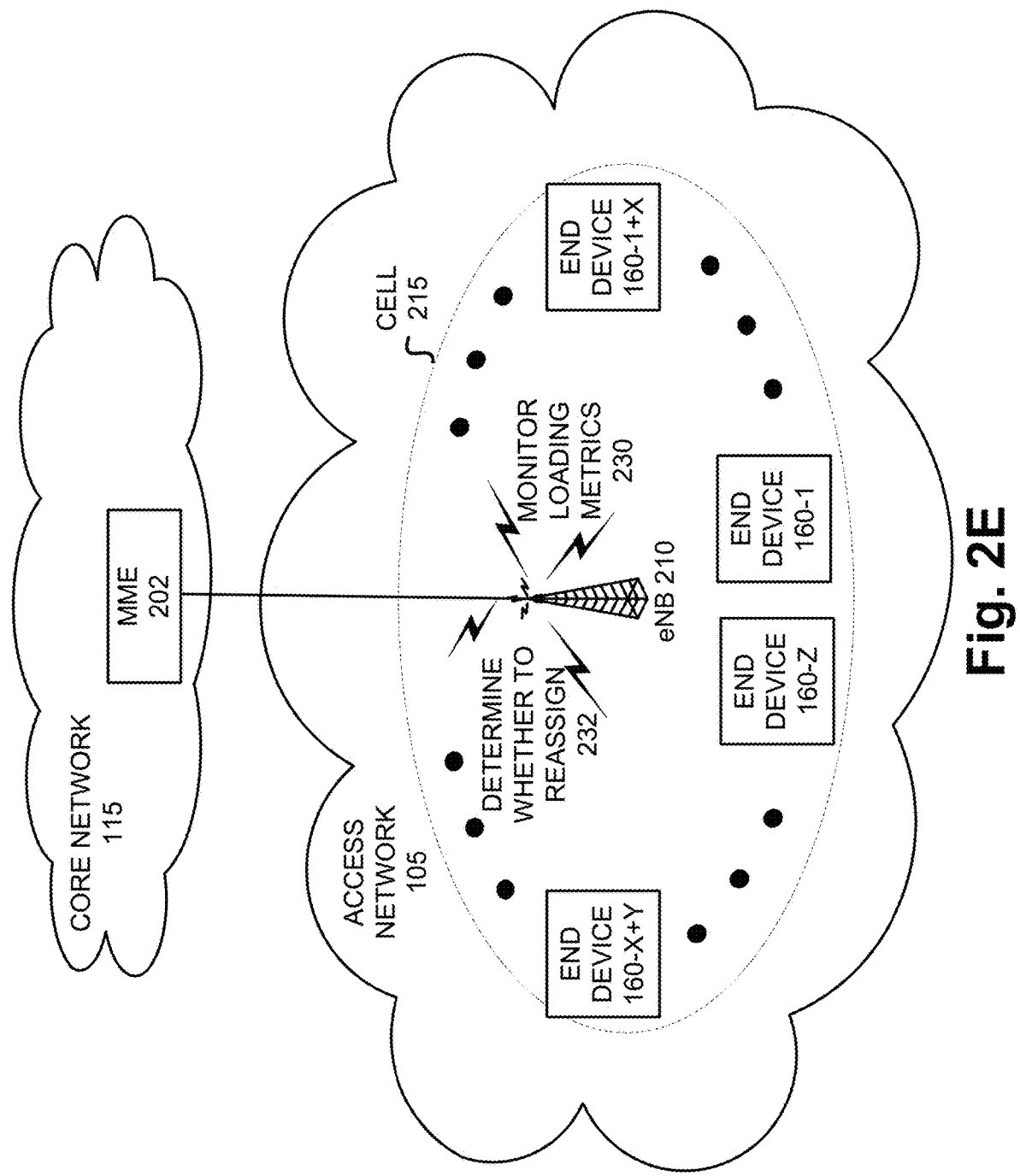

Referring to FIG. 2E, eNB 210 monitors the current load and the loading metrics 230. For example, eNB 210 may re-calculate or update the current load and loading metrics values for each access mode. Since these values will change over time, eNB 210 re-evaluates these values. For example, based on the monitoring, eNB 210 determines whether to reassign 232 the access mode of one or multiple end devices 160 to a different access mode. According to an exemplary implementation, eNB 210 determines whether one loading metric is higher than a threshold and whether another loading metric is lower that another threshold. By way of example, eNB 210 may determine that an NB-IoT loading metric is higher than an NB-IoT threshold. The NB-IoT threshold may be implemented as a particular value (e.g., a ratio, a percentage, etc.). The NB-IoT threshold may also include a time value or a unit of measurement of time that indicates a time period during which the NB-IoT loading metric should be higher than the particular value. Additionally, when eNB 210 determines that the NB-IoT loading metric satisfies the NB-IoT threshold, eNB 210 determines whether another loading metric (e.g., an eMTC mode A loading metric, an eMTC mode B loading metric, an LTE loading metric) is under an eMTC or an LTE threshold. The threshold may be implemented as a particular value (e.g., a ratio) and may also include a time value or a unit of time of measurement. When eNB 210 determines that the other loading metric is under-loaded based on the other threshold, eNB 210 may select and reassign one or multiple end devices 160 to the alternate or under-loaded access mode. However, when eNB 210 determines that the other loading metric is not under-loaded based on the other threshold, eNB 210 may continue to monitor the loading metrics in order to identify an offloading opportunity and/or perform other load balancing measures.

Figure 2F:
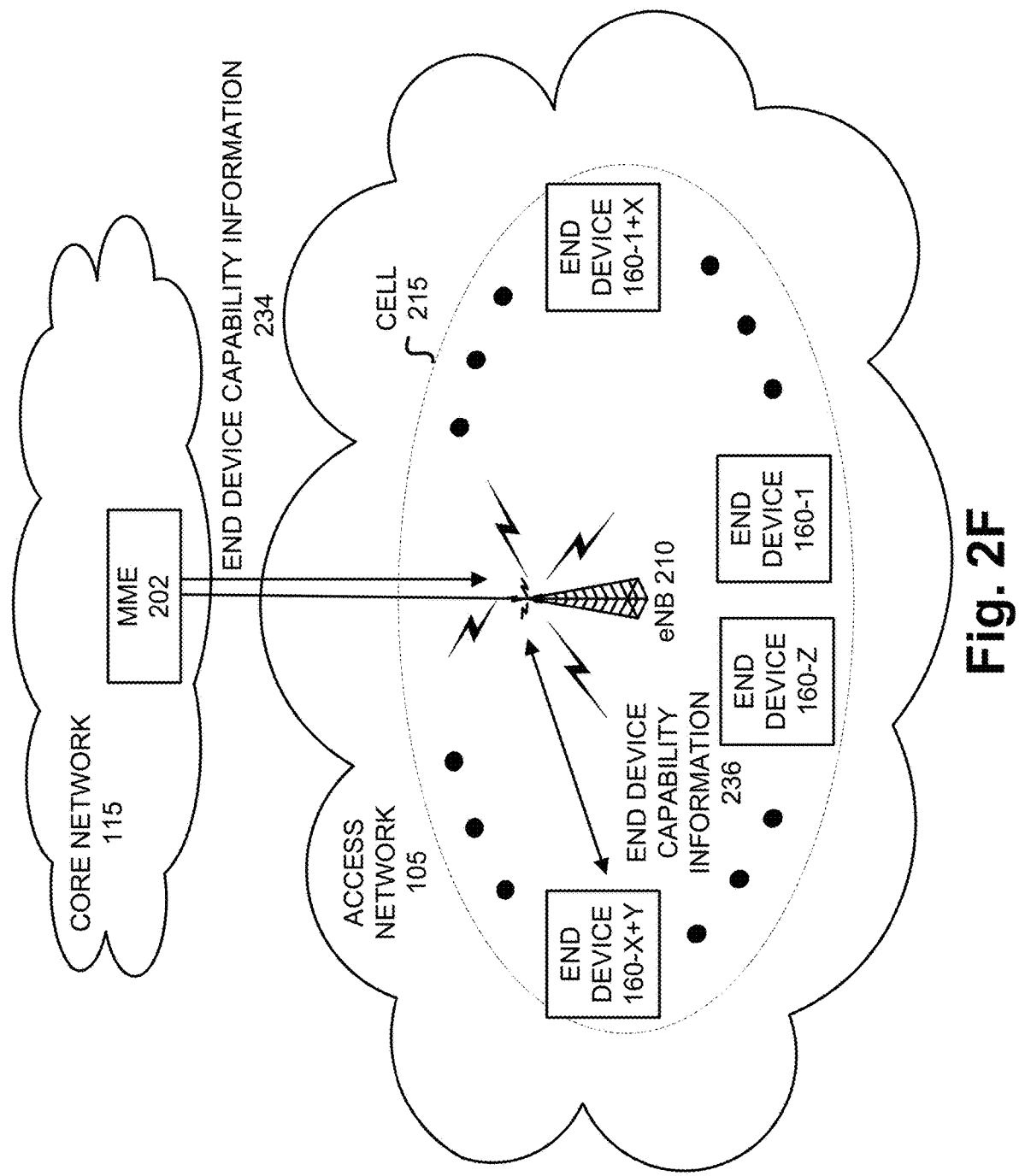

As previously described, eNB 210 uses end device capability information to determine which end devices 160, if any, are able to be reassigned. That is, eNB 210 may reassign end device 160 that is currently connected to eNB 210 using the overloaded access mode and is able to connect to eNB 210 using the under-loaded access mode. Referring to FIG. 2F, according to an exemplary implementation, eNB 210 receives the end device capability information from MME 202. For example, subsequent to MME 202 obtaining subscriber information from a home subscriber server (HSS) or a home location register (HLR) (not illustrated) during an attach procedure, MME 202 transmits the end device capability information to eNB 210. For example, the end device capability information may be included in an S1AP Initial Context Setup Request. eNB 210 stores the end device capability information. According to another exemplary implementation, eNB 210 obtains the end device capability information from end device 160. For example, eNB 210 transmits a control/signaling message, such as a user equipment (UE) capability enquiry message, to end device 160. Typically, this message is a request for a user equipment (UE) to list its capabilities regarding RATs (e.g., E-UTRA, UTRA, CDMA 2000, GERAN-CS, etc.). However, such a message may be used to request the end device capability information. In response to receiving the control/signaling message, end device 160 generates and transmits a control/signaling message, such as a UE capability information message, to eNB 210. eNB 210 stores the end device capability information.

According to various embodiments, the end device capability information can include various instances of data. For example, the end device capability information includes the access modes supported by end device 160 (e.g., LTE, eMTC mode A, eMTC mode B, and/or NB-IoT). The end device capability information may also include the operating band(s) supported in EUTRA (e.g., band 1, 2, etc.) and/or other RATs. The end device capability information may further include information regarding the application(s) from which data to be transmitted originates. By way of example, the information may include QoS requirements (e.g., delay, bit error rate, bandwidth, bit rate, jitter, etc.) pertaining to an application resident on end device 160 or data to be transmitted. The information may also include other characteristics such as the average amount of data, frequency of transmission, and/or other attributes associated with end device communications that may be useful to eNB 210 for selection and assignment of access mode.

Figure 2G:
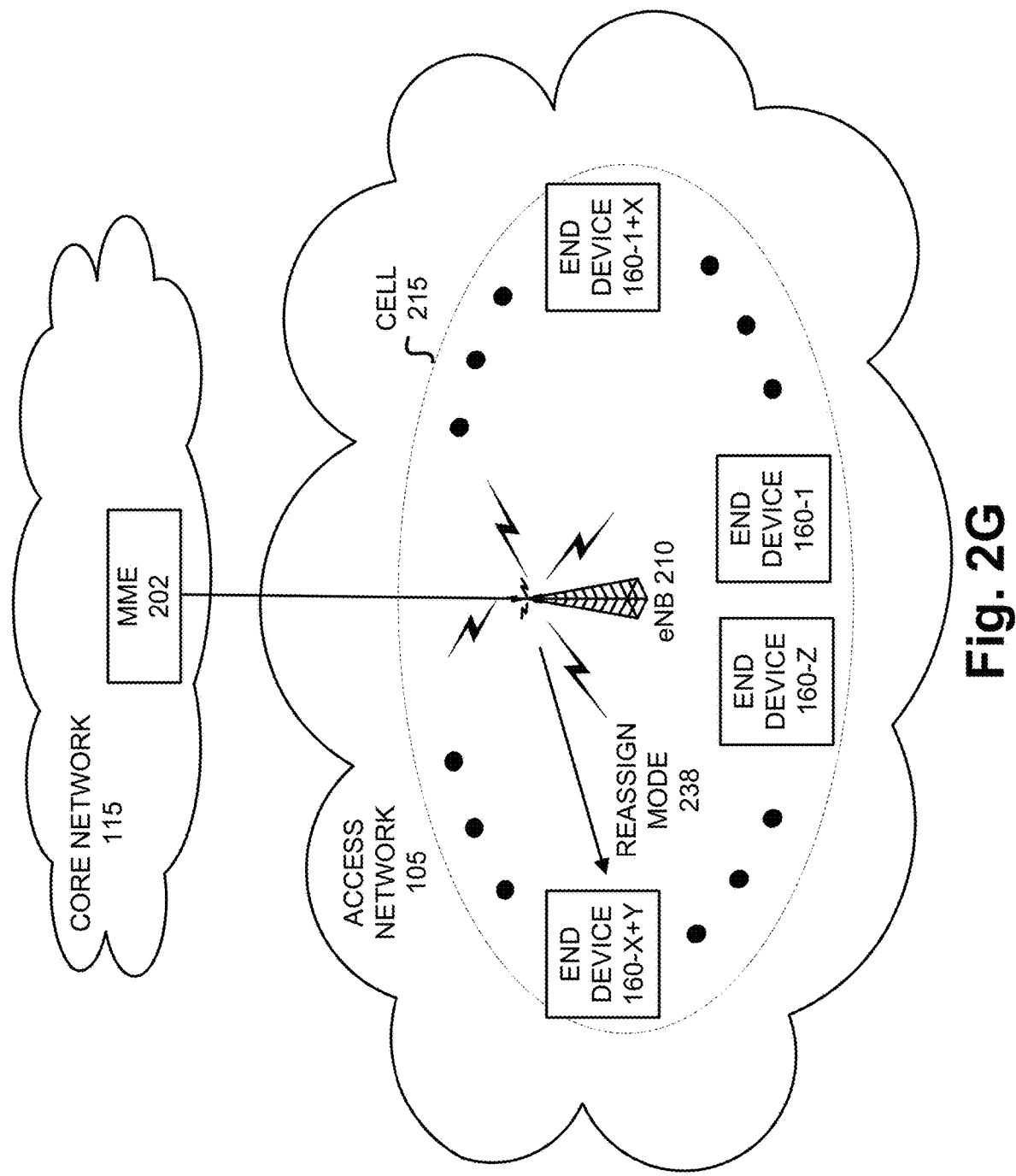
Figure 3:
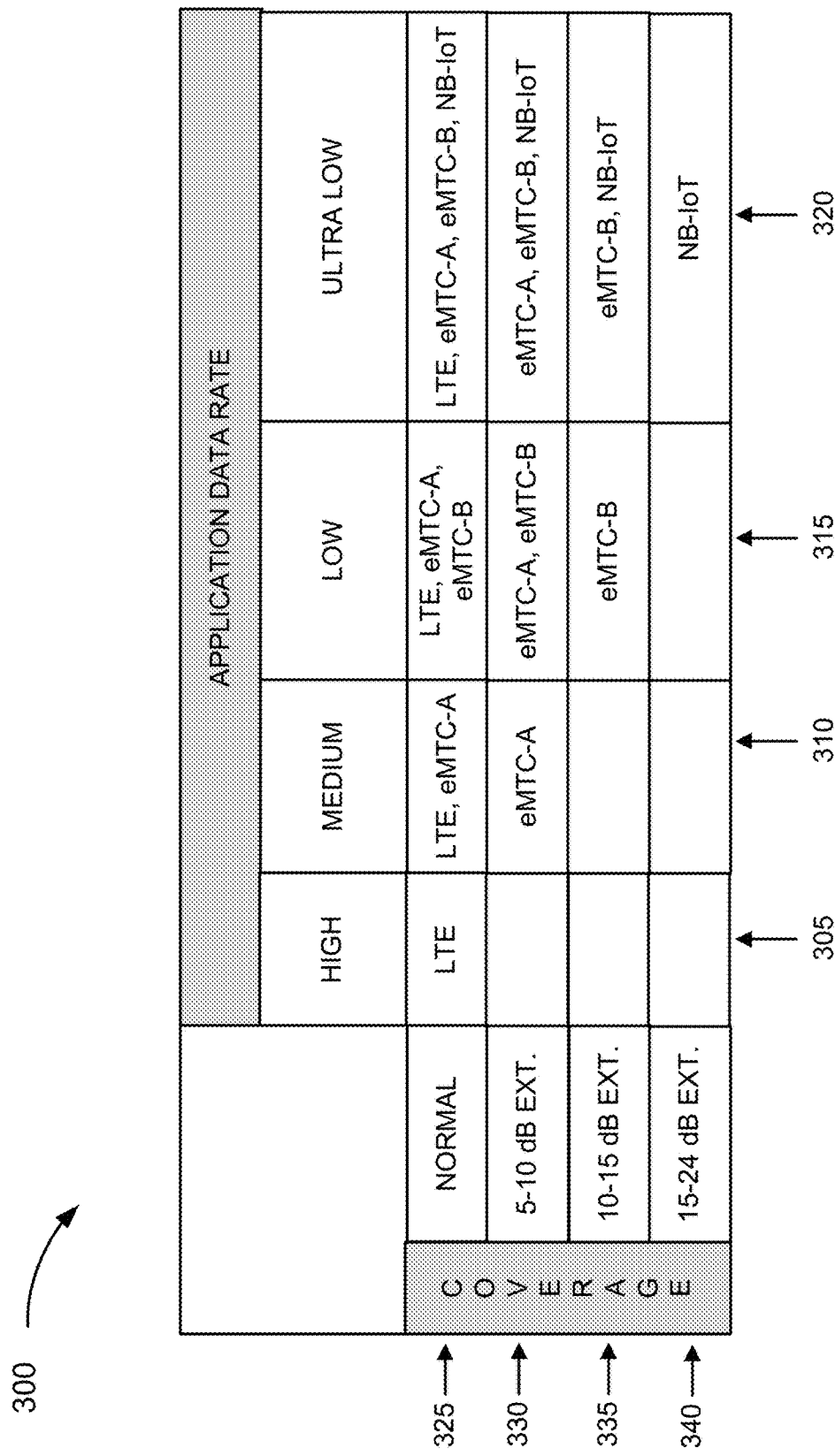
FIG. 3 is a diagram illustrating an exemplary table that stores access information.

Referring to FIG. 2G, when eNB 210 determines that one loading metric is higher than a threshold and another loading metric is lower that another threshold, eNB 210 may reassign one or multiple end devices 160 from access mode to another access mode 238. eNB 210 may use the end device capability information, as previously described in relation to FIG. 2F, to select which end devices 160, if any, may be reassigned. For example, assume that eNB 210 determines that the NB-IoT is overloaded and the eMTC mode B is underloaded. eNB 210 may select a candidate end device 160 for potential reassignment when the end device capability information indicates that the candidate end device 160 supports both NB-IoT mode and eMTC mode B and that the candidate end device 160 is currently connected to eNB 210 in the NB-IoT mode. eNB 210 may also consider other information included in the end device capability information, such as information regarding the application(s) (e.g., QoS requirements, other characteristics, etc.), as described herein.

eNB 210 may also apply one or multiple rules or heuristics when load balancing, calculating a loading metric for access modes, calculating an order of priority for access modes, reassigning access mode, etc. For example, FIG. 3 is a diagram of an exemplary table 300 that stores profile information. eNB 210 may store the profile information. As illustrated, table 300 includes various columns, such as a high field 305, a medium field 310, a low field 315, and an ultra low field 320. High field 305, medium field 310, low field 315, and ultra low field 320 each relates to a level for an application data rate. Table 300 also includes various rows, such as normal field 325, a 5-10 dB field 330, a 10-15 dB field 335, and a 15-24 dB field 340. Normal field 325, 5-10 dB field 330, 10-15 dB field 335, and 15-24 dB field 340 each relates to coverage extension. As illustrated, the entries in table 300 indicate an order of priority given the parameters of coverage extension and application data rate. For example, for normal coverage and a high application data rate, a preferred mode of access is LTE. According to another example, for normal coverage and a medium application data rate, a preferred order for mode access is first LTE and second eMTC mode A.

According to other implementations, table 300 may include additional instances of data, fewer instances of data, and/or different types of data. For example, table 300 may also correlate QoS requirements and/or other application characteristics to application data rate and coverage extension. The nomenclature of table 300 (e.g., high, medium, 5-10 dB, etc.) and the order of priority are exemplary. For example, QoS requirements for an application of an end device 160 that connects to eNB 210 in the NB-IoT mode may be assigned a higher priority than an end device 160 that connects to eNB 210 in the LTE mode. In this regard, the order of priority may not only depend on the parameters (e.g., application data rate, coverage extension, QoS, etc.) but also weights assigned to such parameters, which may be configurable, may be dynamic over time based on network conditions, etc. Additionally, since the nomenclature is configurable, according to other implementations, table 300 may have different types of fields, parameters, etc.

As described, when eNB 210 determines that the other loading metric is not under-loaded based on the other threshold, eNB 210 may continue to monitor the loading metrics in order to identify an offloading opportunity and/or perform other load balancing measures. For example, when resources allocated for LTE devices are heavily loaded, eNB 210 may reduce the number of eMTC and/or NB-IoT inband channels. Alternatively, when resources allocated for eMTC devices are heavily loaded, eNB 210 may set up additional eMTC channels and/or reduce the number of NB-IoT channels. Further, when resources allocated for NB-IoT devices are heavily loaded, eNB 210 may set up additional NB-IoT channels. eNB 210 may also perform these load balancing measures instead of or in addition to the reassignment of end devices 160 to a different mode of access.

eNB 210 may also consider other factors during reassignment, such as current RF conditions relative to a particular end device 160. For example, there may be a tradeoff in performance when considering reassignment of access mode in view of the current access mode and associated coverage extension and RF conditions. For example, for an end device 160 with extreme signal-to-noise ratio, NB-IoT may be preferred over eMTC mode A/B.

Referring back to FIG. 2G, according to this example, assume that eNB 210 selects at least one end device 160 to reassign. As previously described, eNB 210 may transmit an RRC Connection Release message, which carries access information, to the selected end device 160. In response to receiving the RRC message, end device 160 may reattach using the access mode indicated in the RRC Connection Release message.

Although FIGS. 2A-2G illustrate an exemplary process of the access service, according to other exemplary embodiments, additional, fewer, and/or different operations may be performed.

Figure 4:
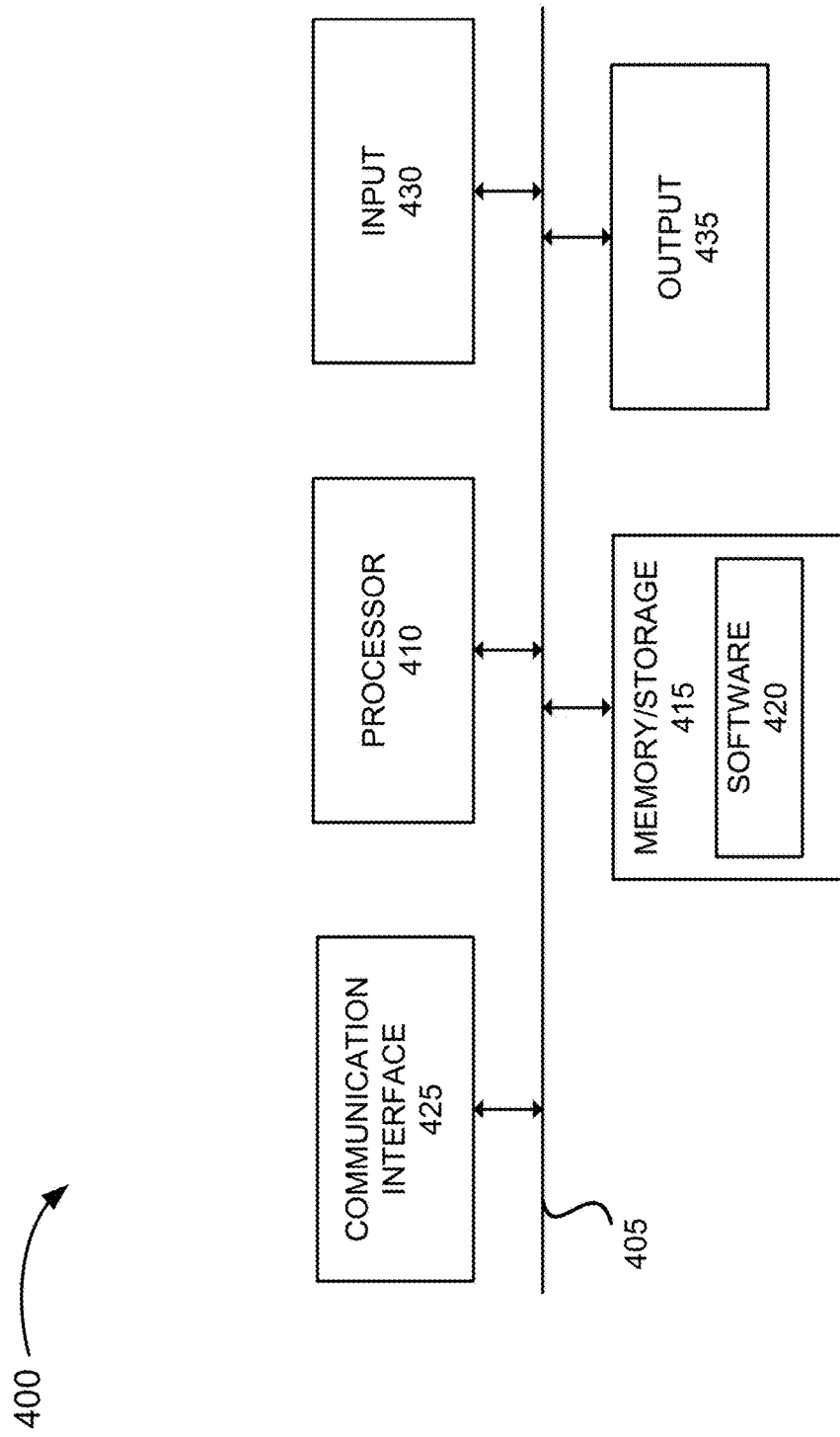
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to components of wireless station 110, end device 160, eNB 210, and MME 202. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to wireless station 110 and eNB 210, software 420 may include an application that, when executed by processor 410, provides the functions of the access service, as described herein. Similarly, end device 160 may include an application that, when executed by processor 410, provides the functions of the access service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
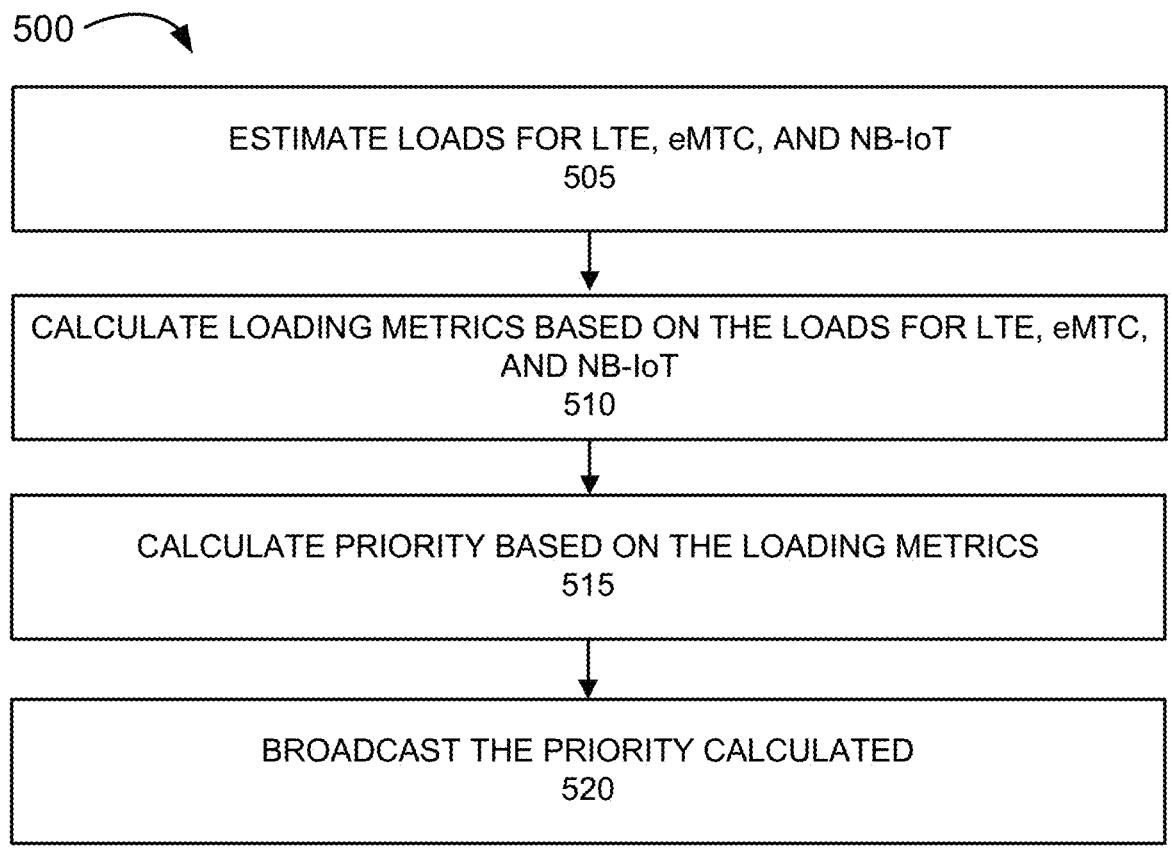
FIG. 5A is a flow diagram of an exemplary process of the access service performed by a wireless station.

FIG. 5A is a flow diagram illustrating an exemplary process 500 pertaining to the access service. Process 500 is directed to a process previously described with respect to FIGS. 2A-2D, as well as elsewhere in this description, in which an order of priority for access modes is calculated and provided to end device 160. According to an exemplary embodiment, wireless station 110 performs steps of process 500. For example, processor 410 executes software 420 to perform the steps illustrated in FIG. 5A and described herein.

Referring to FIG. 5A, block 505 of process 500, loads for a plurality of access modes are estimated. For example, wireless station 110 estimates loads for LTE, eMTC mode A, eMTC mode B, and NB-IoT modes of access. As previously described, the loads may include usage of various resources (e.g., radio, PRBs, etc.), as well as other resource types (e.g., hardware load indicator, etc.). Wireless station 110 may attribute a load to a given mode of access.

In block 510, a loading metric is calculated for each mode of access based on its corresponding estimated load. For example, wireless station 110 calculates a loading metric for each mode of access based on the current load relative to a nominal load.

In block 515, an order of priority is calculated. For example, wireless station 110 calculates the order of priority for access modes based on the loading metrics. Wireless station 110 may identify the order of priority for the modes of access in correspondence to the least loaded mode of access indicated by a loading metric to the most loaded mode of access indicated by a loading metric.

In block 520, the order of priority is broadcasted. For example, wireless station 110 broadcasts access information, which includes the order of priority for access modes, to end devices 160. According to an exemplary embodiment, the access information is included in a SIB message. According to various exemplary implementations, the SIB message may be a Type 1, 4, 5, 6, or 7.

Although FIG. 5A illustrates an exemplary process 500 of the access service, according to other embodiments, process 500 may include additional operations, fewer operations, and/or different operations than those illustrated in FIG. 5A and described herein.

Figure 5B:
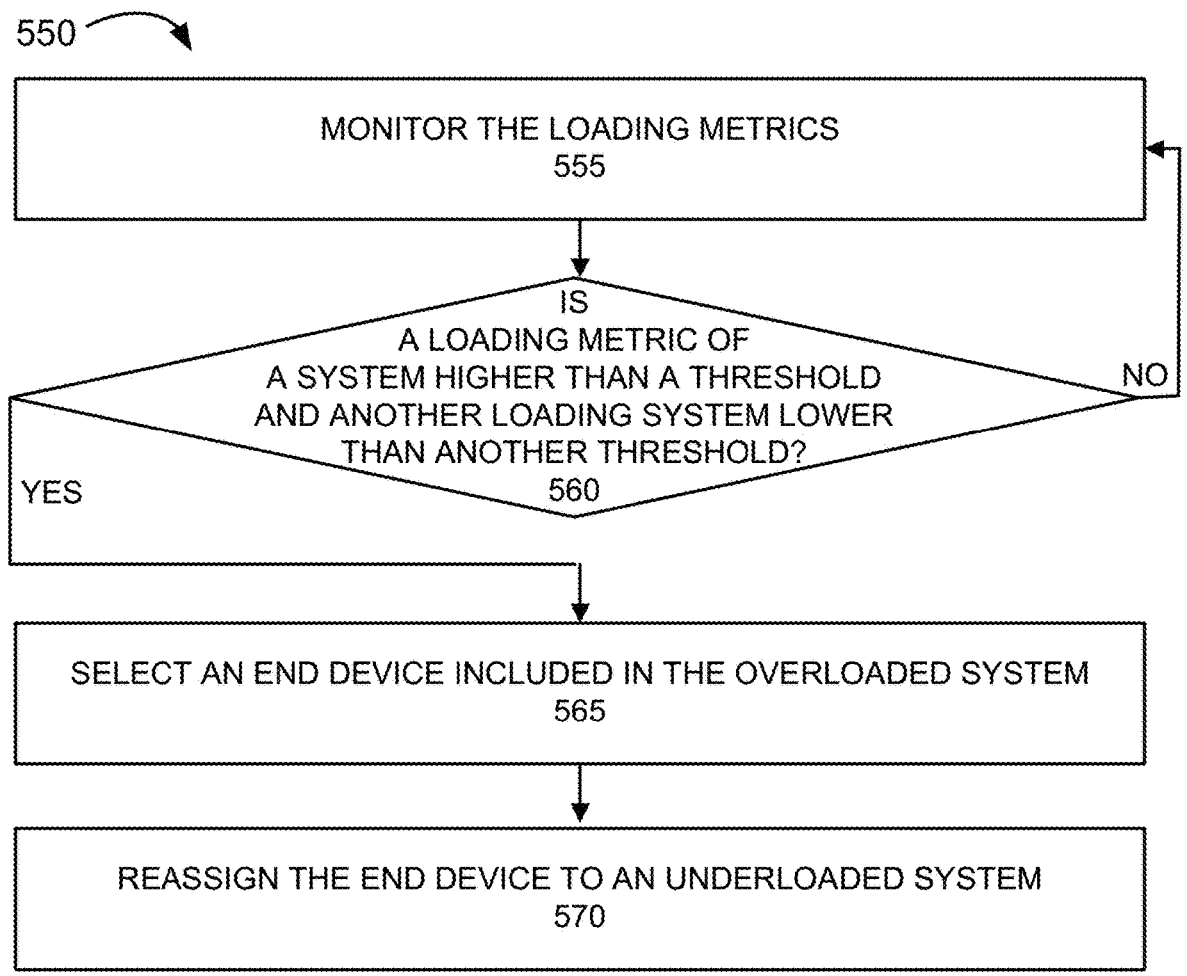
FIG. 5B is a flow diagram of another exemplary process of the access service performed by the wireless station.

FIG. 5B is a flow diagram illustrating an exemplary process 550 pertaining to the access service. Process 550 is directed to a process previously described with respect to FIGS. 2E-2G, as well as elsewhere in this description, in which an access mode reassignment procedure is performed. According to an exemplary embodiment, wireless station 110 performs steps of process 550. For example, processor 410 executes software 420 to perform the steps illustrated in FIG. 5B and described herein.

Referring to FIG. 5B, block 555 of process 550, loading metrics for modes of access are monitored. For example, wireless station 110 tracks the loads for LTE, eMTC mode A, eMTC mode B, and NB-IoT modes of access and calculates the loading metric for each mode of access.

In block 560, it is determined whether a loading metric is higher than a threshold and another loading metric is lower than the threshold or another threshold. For example, wireless station 110 determines whether one mode of access is overloaded based on the threshold and corresponding loading metric and another mode of access is underloaded based on the other threshold and corresponding other loading metric.

When it is determined that the loading metric is higher than the threshold, but another mode of access is not lower than the other threshold (block 560—NO), then process 550 may return to block 555. For example, wireless station 110 may continue to monitor the loading metrics in order to identify an offloading opportunity and/or perform another type of loading balancing.

When it is determined that the loading metric is higher than the threshold, and another mode of access is lower than the other threshold (block 560—YES), an end device using the overloaded mode of access is selected. For example, wireless station 110 identifies an end device 160 for reassignment based on end device capability information associated with the end device 160. The end device 160 is connected to wireless station 110 in the overloaded mode of access but also supports the underloaded mode of access.

In block 570, the end device is reassigned to the underloaded mode of access. For example, wireless station 110 may unicast an RRC Connection Release message, which carries access information, to the selected end device 160. In response to receiving the RRC Connection Release message, end device 160 may reattach via the mode of access corresponding to the reassignment.

Although FIG. 5B illustrates an exemplary process 550 of the access service, according to other embodiments, process 550 may include additional operations, fewer operations, and/or different operations than those illustrated in FIG. 5B and described herein. For example, as previously described, wireless station 110 may perform load balancing measures, such as reducing the number of channels allocated to a particular mode of access, set up additional channels associated with a particular mode of access, consider RF conditions, etc.

FIGS. 6A-6G are diagrams illustrating an exemplary process of the access service from an end device-side perspective. In FIGS. 6A-6G, assume that access network 105 is implemented as an E-UTRAN of an LTE or LTE-A network, and that wireless station 110 is implemented as eNB 210. Also, assume that one or more of end devices 160 are capable of operating in more than one access mode (e.g., LTE mode, eMTC mode A, etc.).

Figure 6A:
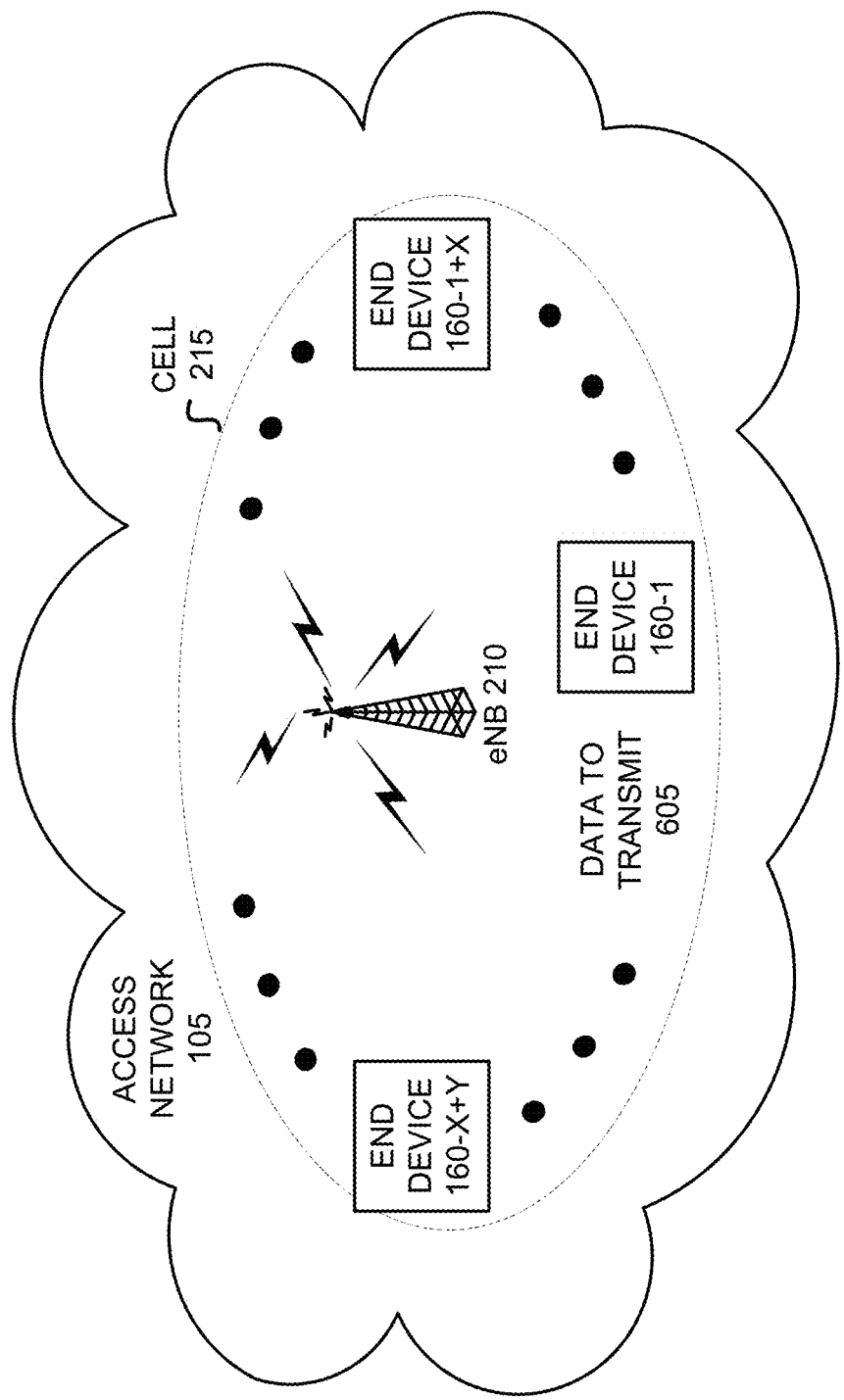
FIGS. 6A-6G are diagrams illustrating an exemplary process of the access service from an end device perspective.
Figure 6B:
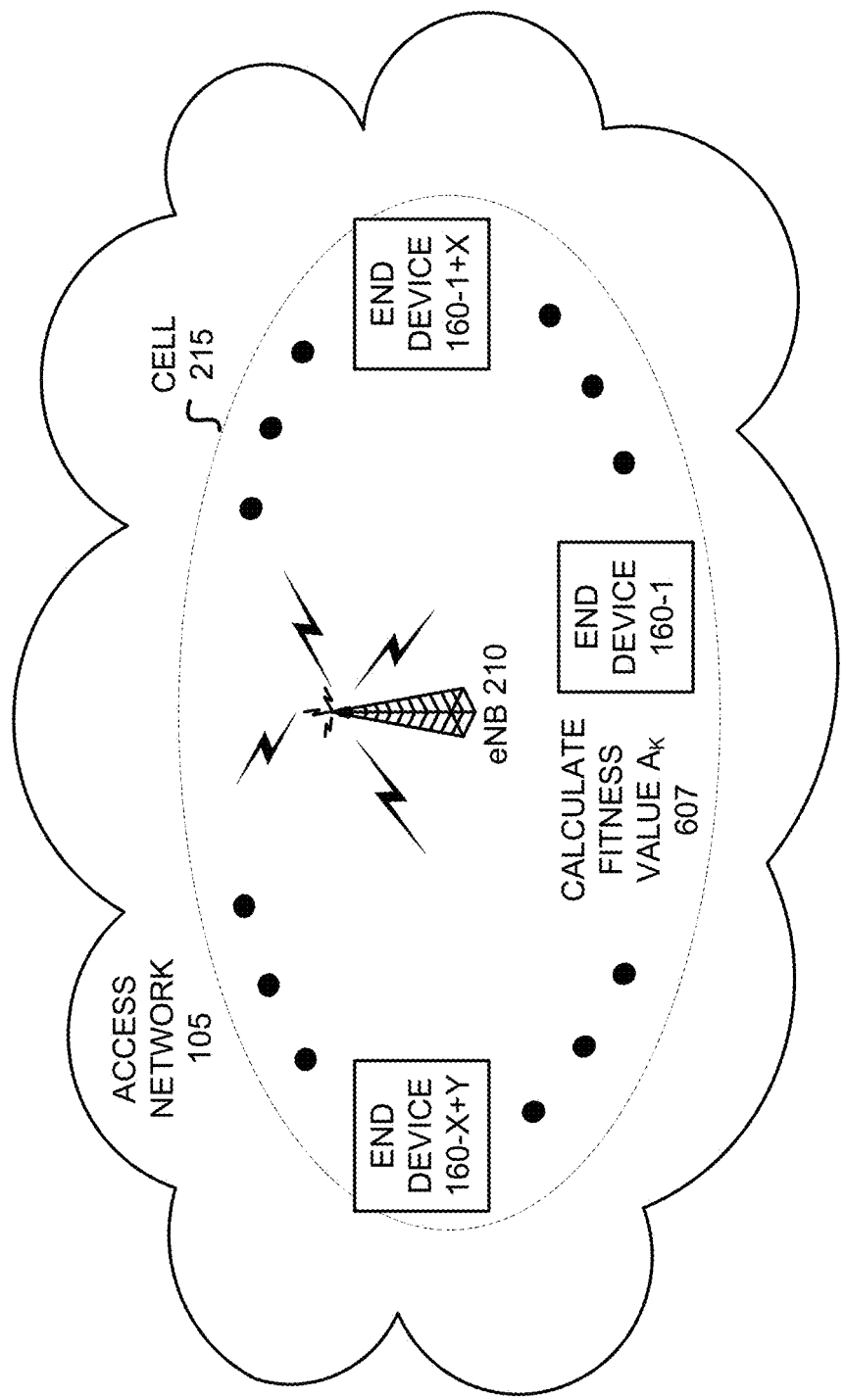

Referring to FIG. 6A, according to an exemplary scenario, assume that end device 160-1 has data to transmit 605 via eNB 210. For example, an application resident on end device 160 has made a request to transmit data or some other triggering event causes end device 160 to enter a state by which data is to be transmitted. In FIG. 6B, in response to this state, end device 160 calculates a fitness value $A_k$ 607 for each mode of access operable at end device 160. For example, end device 160 may calculate the fitness value $A_k$ based on characteristics associated with the data to be transmitted, such as the number of packets to transmit, the size of the packets, QoS requirements of the data, etc. According to an exemplary implementation, the fitness value $A_k$ calculated may be assigned a value between 0 and 1. For example, a software update session may fit in the traffic characteristics afforded under LTE better than eMTC and NB-IoT. Thus, fitness values may be assigned to the respective access modes, such as fitness values 1.0, 0.5, and 0, depending on the characteristics associated with the data to be transmitted relative to the traffic characteristics afforded by the access modes.

Figure 6C:
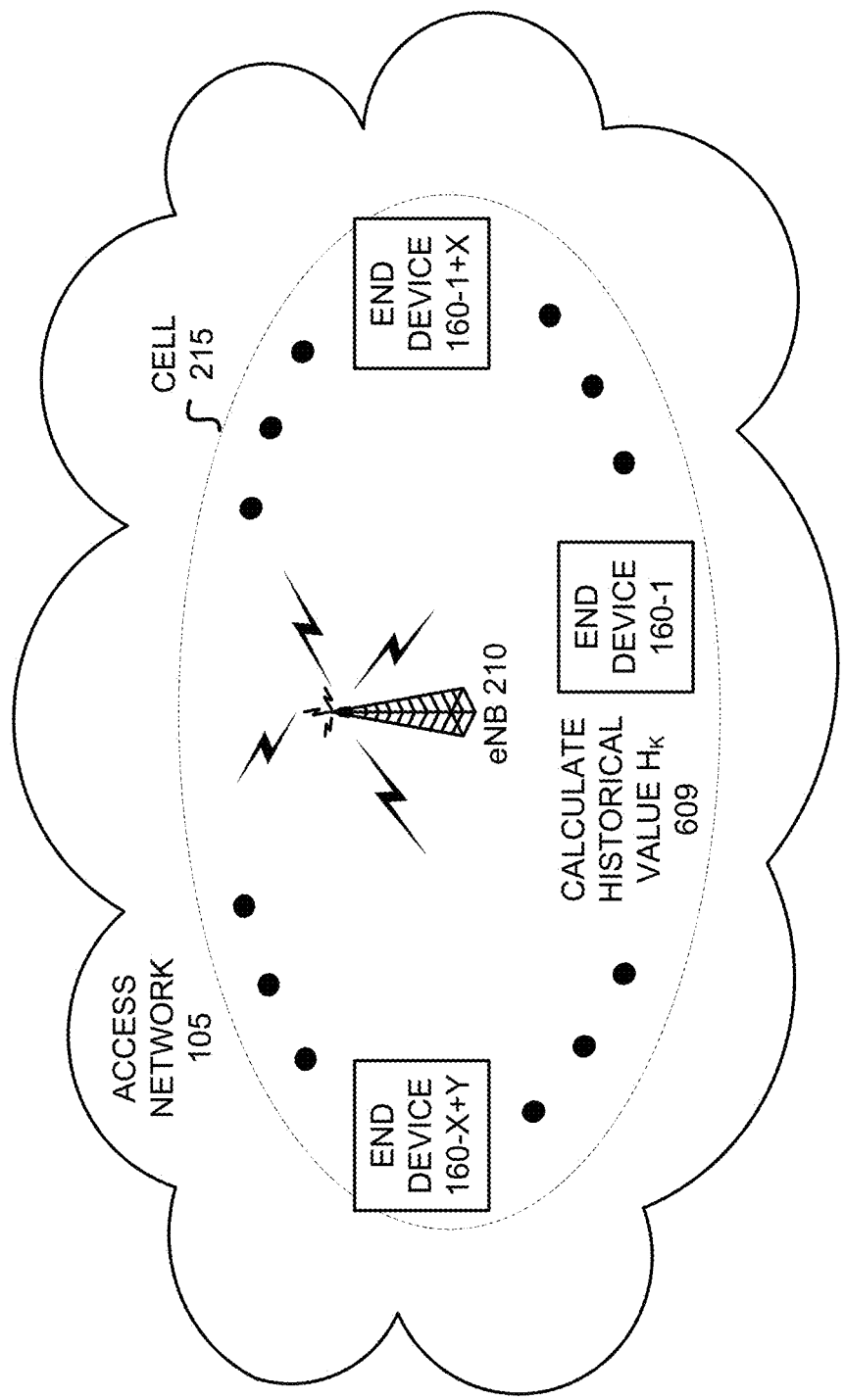

Referring to FIG. 6C, in response to entering the state to transmit data, end device 160 calculates a historical value $H_k$ 609 for each mode of access operable at end device 160. For example, end device 160 may calculate the historical value $H_k$ based on each modes access history. For example, the access history may include information pertaining to the number of times an access mode was used for transmitting data, the success rate, the last used, time of day, geographic location of end device 160, and/or any other context information. End device 160 may assign a weight to each type of instance of access history in order to calculate the historical value $H_k$. According to an exemplary implementation, the historical value $H_k$ calculated may be assigned a value between 0 and 1. For example, an access mode that has an access history more favorable over another access mode may be assigned a higher value. By way of example, an access mode that has consistently yielded successful transmission may be assigned a higher historical value $H_k$ than another access mode that infrequently yielded successful transmission of data.

Figure 6D:
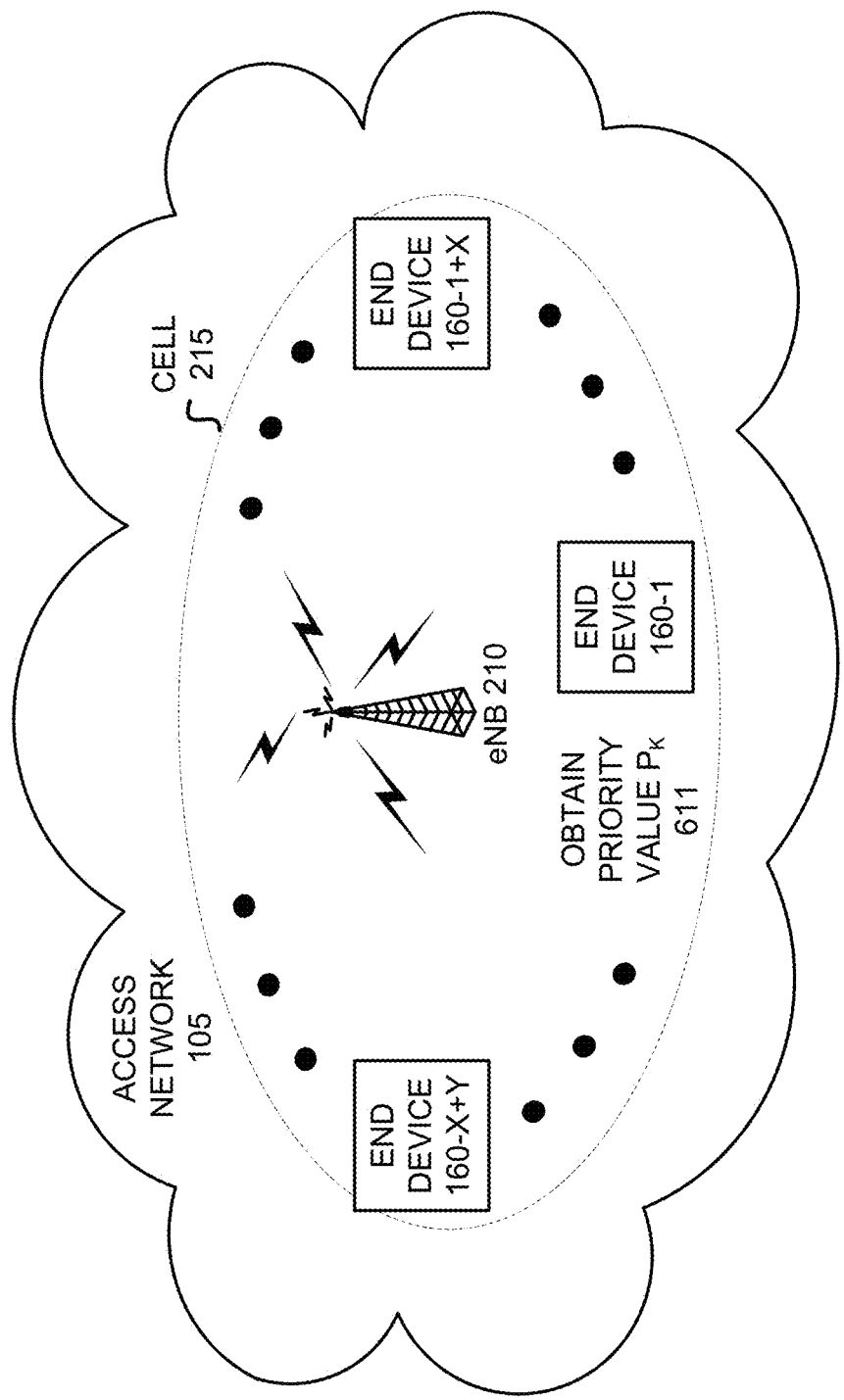
Figure 6E:
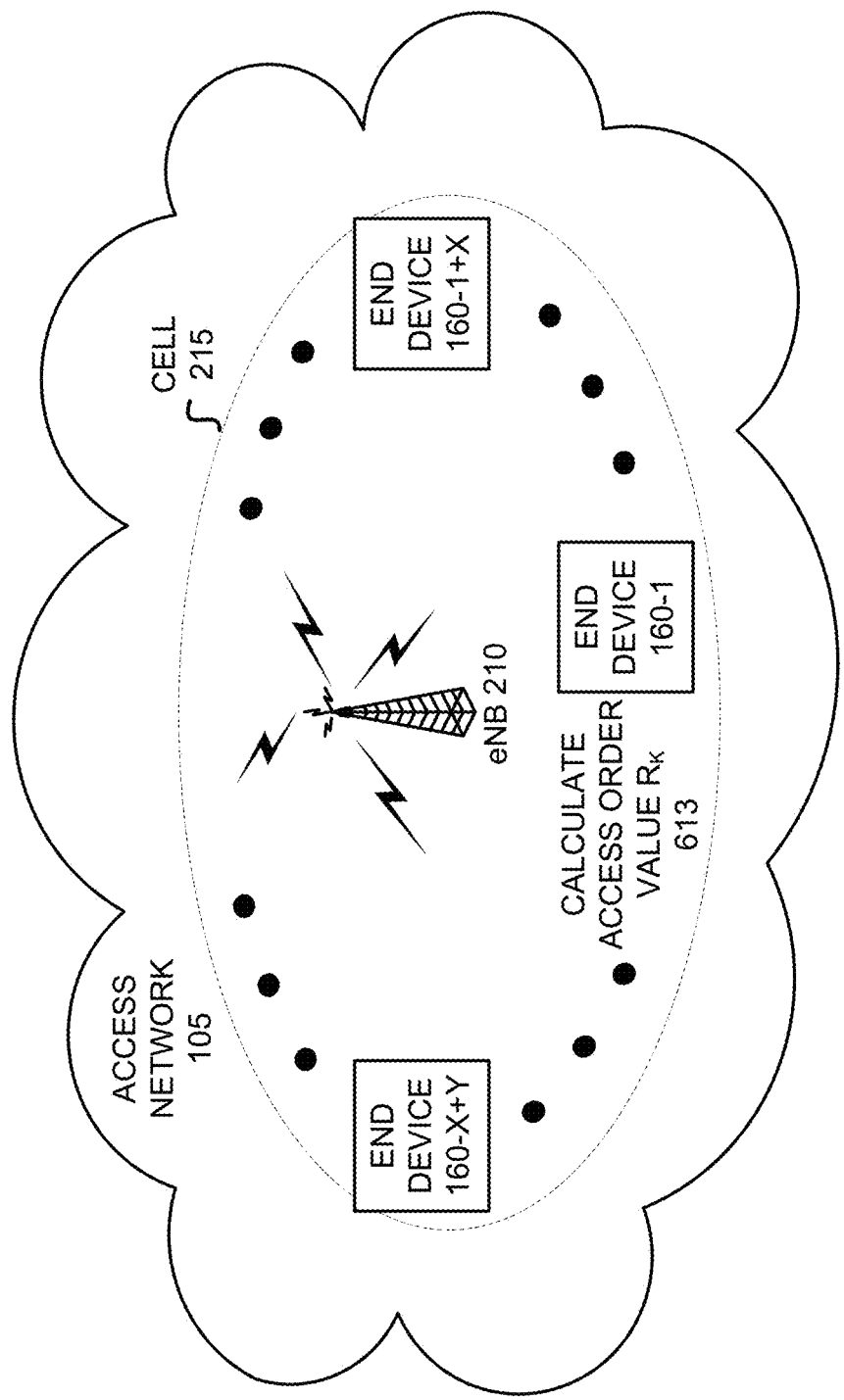

Referring to FIG. 6D, in response to the state to transmit, end device 160 obtains a priority value $P_k$ 611 for each mode of access operable at end device 160. For example, end device 160 may read the access information, which includes an order of priority for access modes, received from access network 105 (e.g., eNB 210) and stored at end device 160. End device 160 may assign a priority value $P_k$ to each access mode according to its priority. For example, the access mode having the highest priority is assigned a value higher than an access mode having a lower priority. Additionally, or alternatively, end device 160 may store and use profile information to select a priority value $P_k$ and/or use the profile information when calculating the access order value $R_k$, as described herein. For example, FIG. 8 is a diagram of an exemplary table 800 that stores profile information.

Figure 8:
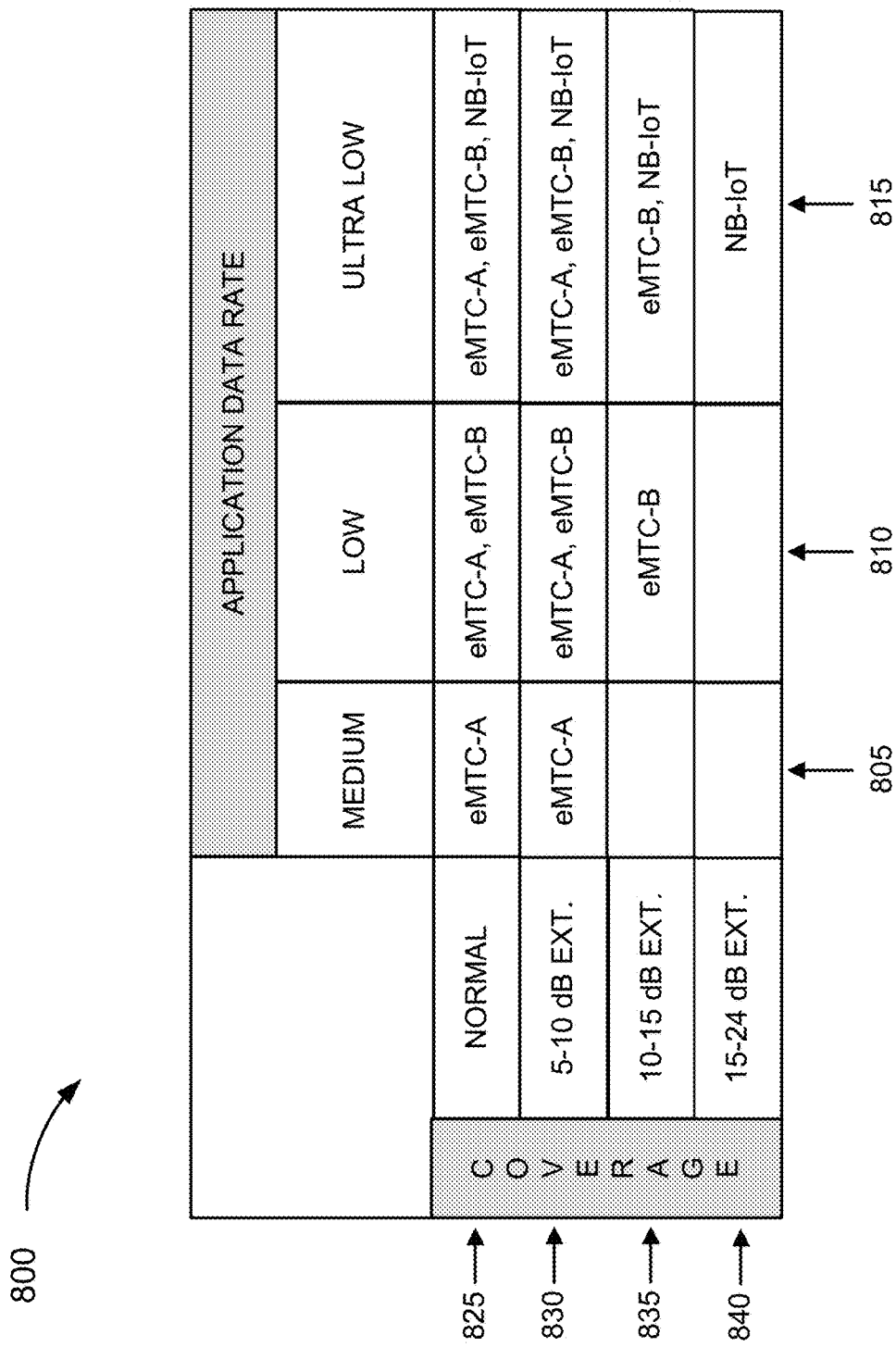
FIG. 8 is a diagram illustrating an exemplary table that stores access information.

As illustrated in FIG. 8, table 800 includes various columns, such as a medium field 805, a low field 810, and an ultra low field 815. Similar to table 300, medium field 805, low field 810, and ultra low field 815 each relates to a level for an application data rate. Table 800 also includes various rows, such as normal field 825, a 5-10 dB field 830, a 10-15 dB field 835, and a 15-24 dB field 840. Normal field 825, 5-10 dB field 830, 10-15 dB field 835, and 15-24 dB field 840 each relates to coverage extension. As illustrated, the entries in table 800 indicate an order of priority given the parameters of coverage extension and application data rate. For example, for normal coverage and a medium application data rate, a preferred mode of access is e-MTC mode A. According to another example, for normal coverage and a low application data rate, a preferred order for mode access is first eMTC mode A and second eMTC mode B. For this example, it may be assumed that end device 160 is not capable of operating in an LTE mode which is why LTE mode is omitted from entry in table 800.

According to other implementations, table 800 may include additional instances of data, fewer instances of data, and/or different types of data. For example, table 800 may also correlate QoS requirements and/or other application characteristics to application data rate and coverage extension. The nomenclature of table 800 (e.g., medium, low, 5-10 dB, etc.) and the order of priority are exemplary. In this regard, the order of priority may not only depend on the parameters (e.g., application data rate, coverage extension, QoS, etc.) but also weights assigned to such parameters, which may be configurable, may be dynamic over time based on network conditions, etc. Additionally, since the nomenclature is configurable, according to other implementations, table 800 may have different types of fields, parameters, etc.

Referring back to FIG. 6E, in response to obtaining the fitness value $A_k$, the historical value $H_k$, and the priority value $P_k$, end device 160 calculates an access order value $R_k$ 613. For example, end device 160 may multiply the fitness value $A_k$, the historical value $H_k$, and the priority value $P_k$ to calculate the access order value $R_k$. Alternatively, for example, end device 160 may add these values or perform some other type of mathematical operation to yield the access order value $R_k$. According to various exemplary implementations, these values may or may not be weighted.

Figure 6F:
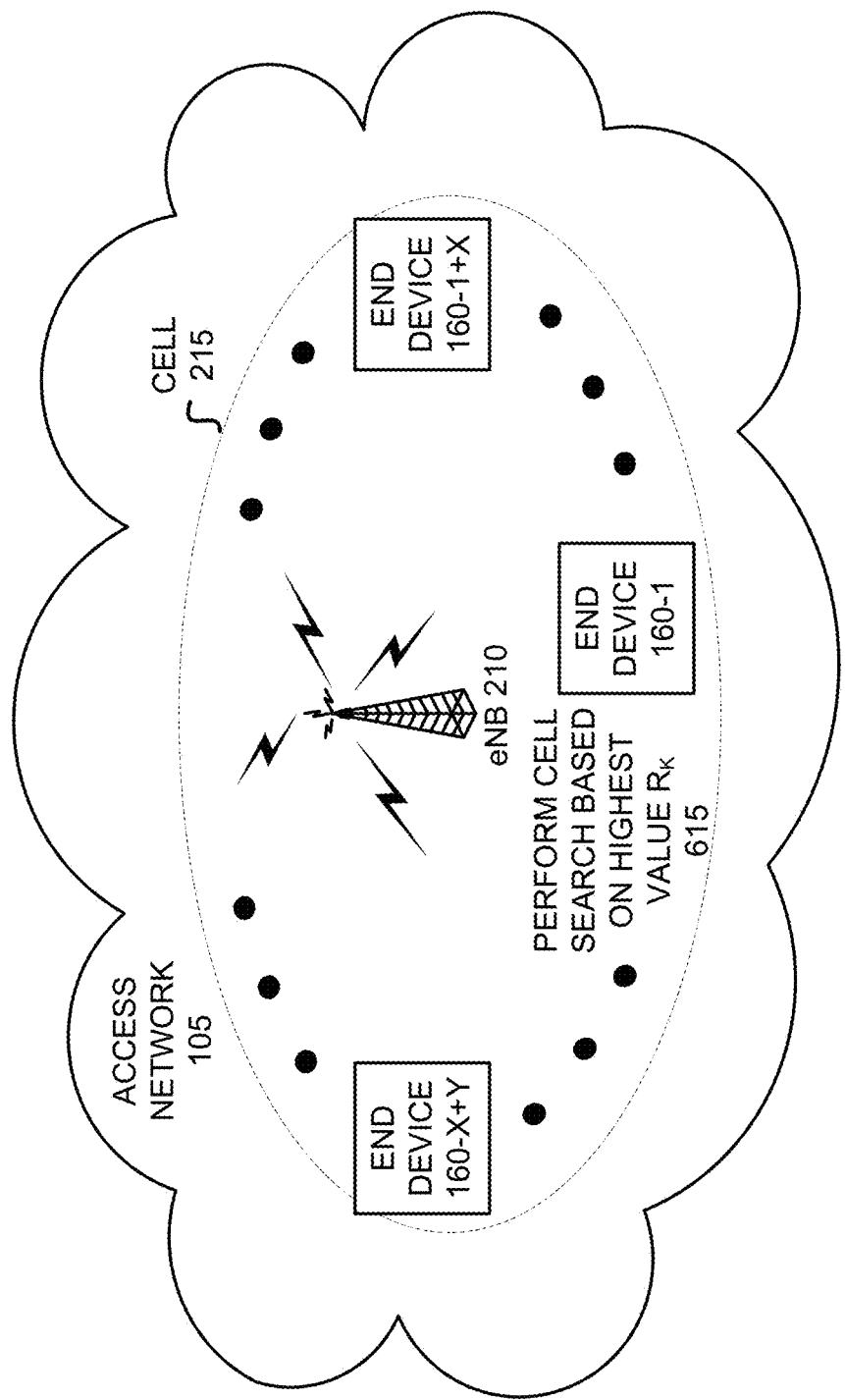

Referring to FIG. 6F, in response to calculating the access order value $R_k$, end device 160 performs a cell search 615 based on the access mode having the highest access order value $R_k$. For example, assume that eMTC mode A yields the highest access order value $R_k$, end device 160 performs a cell search for frequency bands or channels associated with the eMTC mode A. During the cell selection process, end device 160 may make signal measurements and/or calculations (e.g., RSRP, RSSI, RSRQ, etc.), receive synchronization signals (e.g., a primary synchronization signal (PSS) and a secondary synchronization signal (SSS)), and receive a Master Information Block (MIB) and SIBs from eNB 210.

Although a single eNB 210 is illustrated in FIG. 6F, the cell search process may include other eNBs and/or cells not illustrated.

Figure 6G:
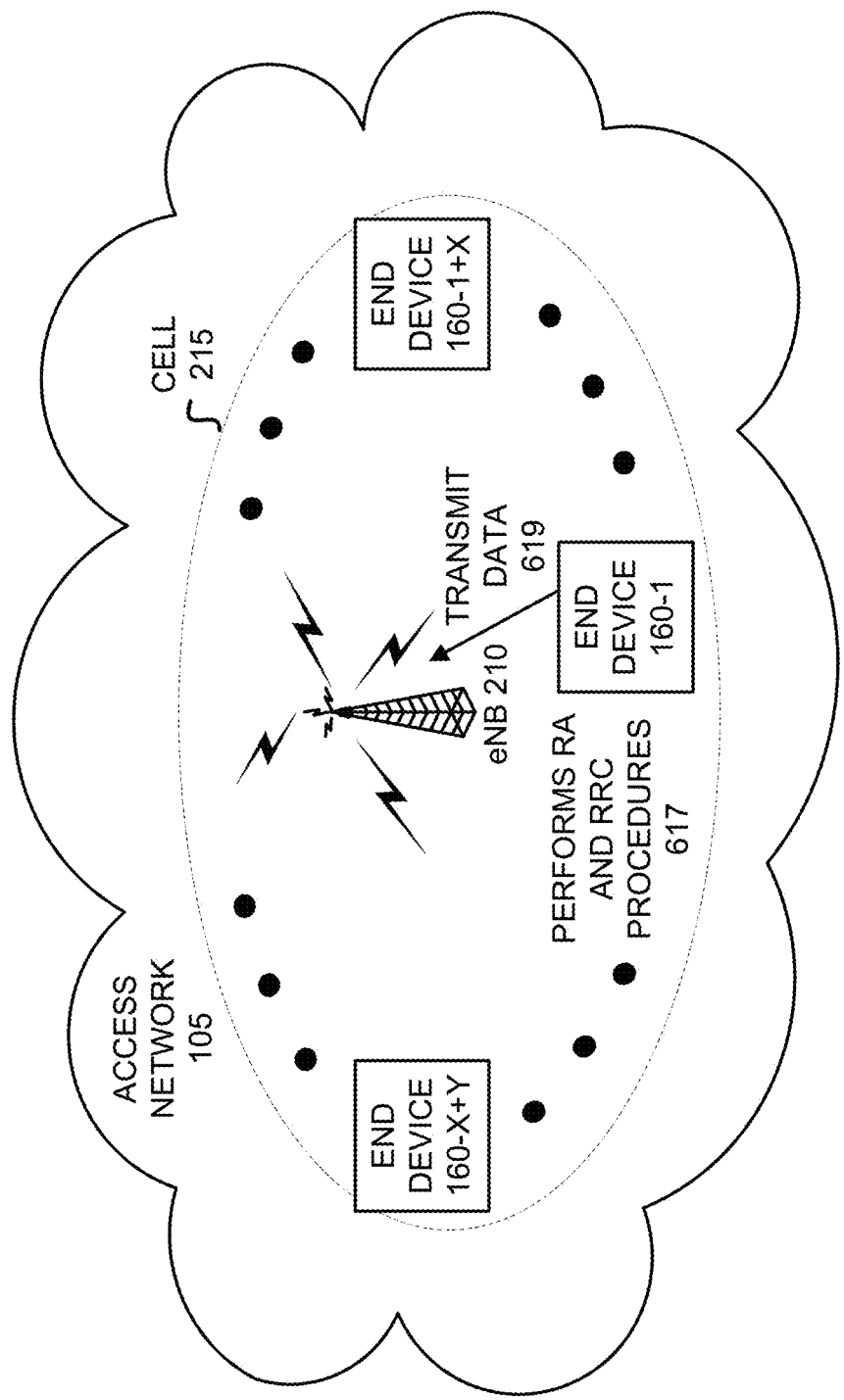

For the sake of description, assume that signal measurement/calculation pertaining to eNB 210 is the highest relative to other eNB s/cells. Consequently, end device 160 selects eNB 210 and cell 215 on which to camp and transmit the data. Referring to FIG. 6G, end device 160 performs random access (RA) procedure and RRC procedures 617. For example, end device 160 performs a contention-based or non-contention-based RA procedure with respect to eNB 210. When the RA procedure is successfully completed, end device 160 initiates an RRC connection establishment procedure. When the RRC procedure is successfully completed, end device 160 may transmit the data 619.

Although FIGS. 6A-6G illustrate an exemplary process of the access service, according to other exemplary embodiments, additional, fewer, and/or different operations may be performed. For example, when end device 160 is unable to find a cell using the access mode of the highest access order value $R_k$, end device 160 may choose another mode with a greater coverage extension and repeat the cell search process. If there are multiple access modes available that offer a greater coverage extension, end device 160 may choose the access mode having the larger access order value $R_k$. Also, the process described may be used according to other scenarios, such when end device 160 initiates an RRC Connection Re-establishment procedure, during a handover, initial access from RRC_IDLE state, etc. Additionally, according to other scenarios, end device 160 may not have data to transmit, but may merely be establishing an RRC connection with eNB 210.

Figure 7A:
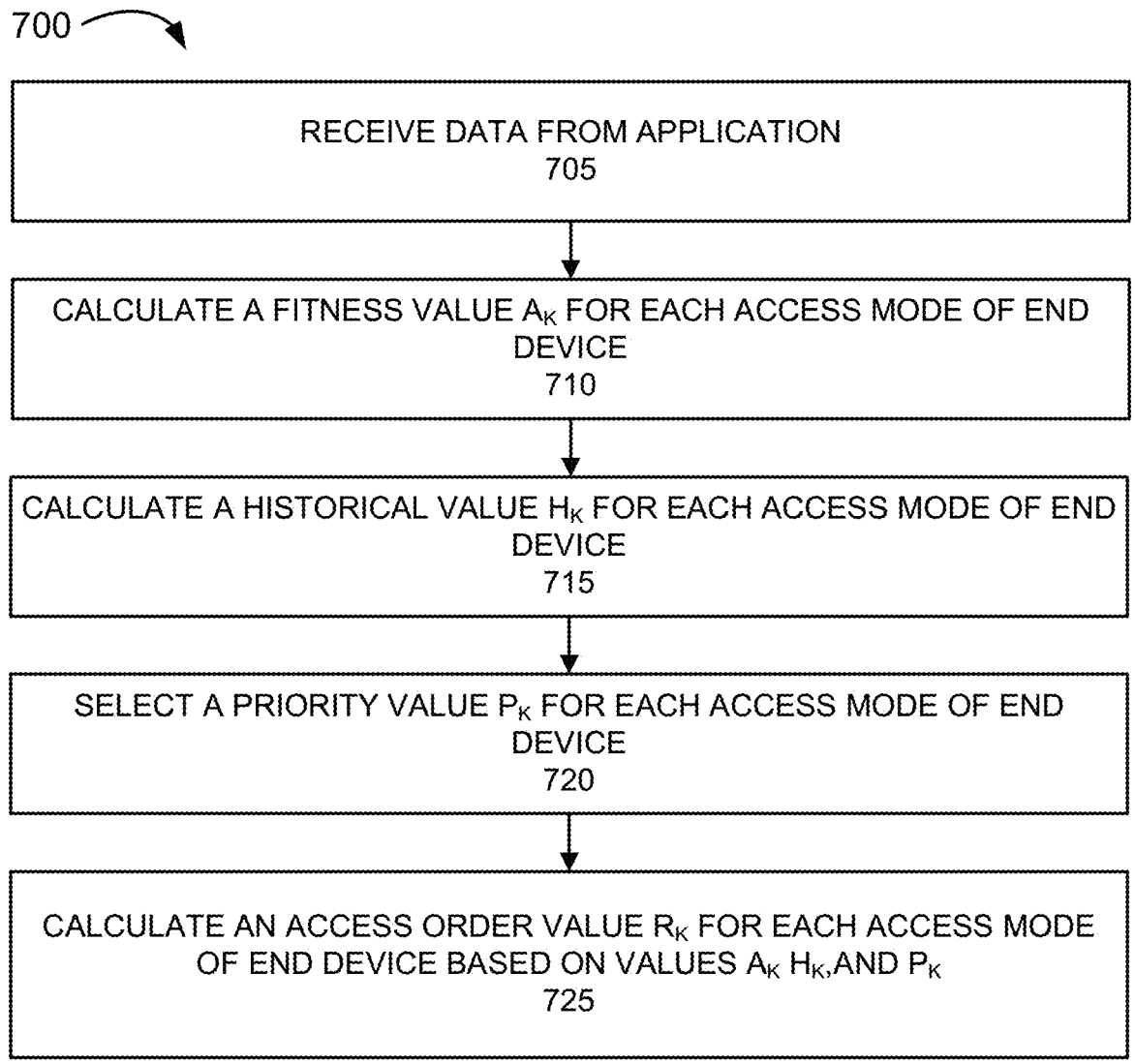
FIG. 7A is a flow diagram of an exemplary process of the access service performed by the end device.

FIG. 7A is a flow diagram illustrating an exemplary process 700 pertaining to the access service. Process 700 is directed to a process previously described with respect to FIGS. 6A-6E, as well as elsewhere in this description, in which an order of priority for access modes is calculated. According to an exemplary embodiment, end device 160 performs steps of process 700. For example, processor 410 executes software 420 to perform the steps illustrated in FIG. 7A and described herein.

Referring to FIG. 7A, block 705, process 700 may begin with receiving data from an application or other source. For example, end device 160 may enter a state in which data is to be transmitted via access network 105.

In block 710, calculate a fitness value $A_k$ for each access mode of end device. For example, end device 160 calculates a fitness value $A_k$ for an LTE mode, an eMTC mode A, an eMTC mode B, and an NB-IoT mode. As previously described, the fitness value $A_k$ may pertain to the characteristics of the data (e.g., number of packets, the size of packets, etc.) to be transmitted. End device 160 may consider characteristics of each access mode (e.g., data rate, repeat transmission, etc.) afforded by the access mode in relation to the data to be transmitted.

In block 715, calculate a historical value $H_k$ for each access mode of end device. For example, end device 160 may store access history information pertaining to the number of times an access mode was used for transmitting data, the success rate, the last used, time of day, geographic location of end device 160, and/or any other context information.

In block 720, select the priority value $P_k$ for each access mode of end device. For example, end device 160 may read the access information, which includes an order of priority for access modes, received from access network 105 (e.g., eNB 210) and stored at end device 160.

In block 725, a real-time access order value $R_k$ is calculated for each access mode based on the fitness value $A_k$, the historical value $H_k$, and the priority value $P_k$. For example, end device 160 may multiply the fitness value $A_k$, the historical value $H_k$, and the priority value $P_k$ to calculate the access order value $R_k$. Alternatively, for example, end device 160 may add these values or perform some other type of mathematical operation to yield the access order value $R_k$.

Although FIG. 7A illustrates an exemplary process 700 of the access service, according to other embodiments, process 700 may include additional operations, fewer operations, and/or different operations than those illustrated in FIG. 7A and described herein.

Figure 7B:
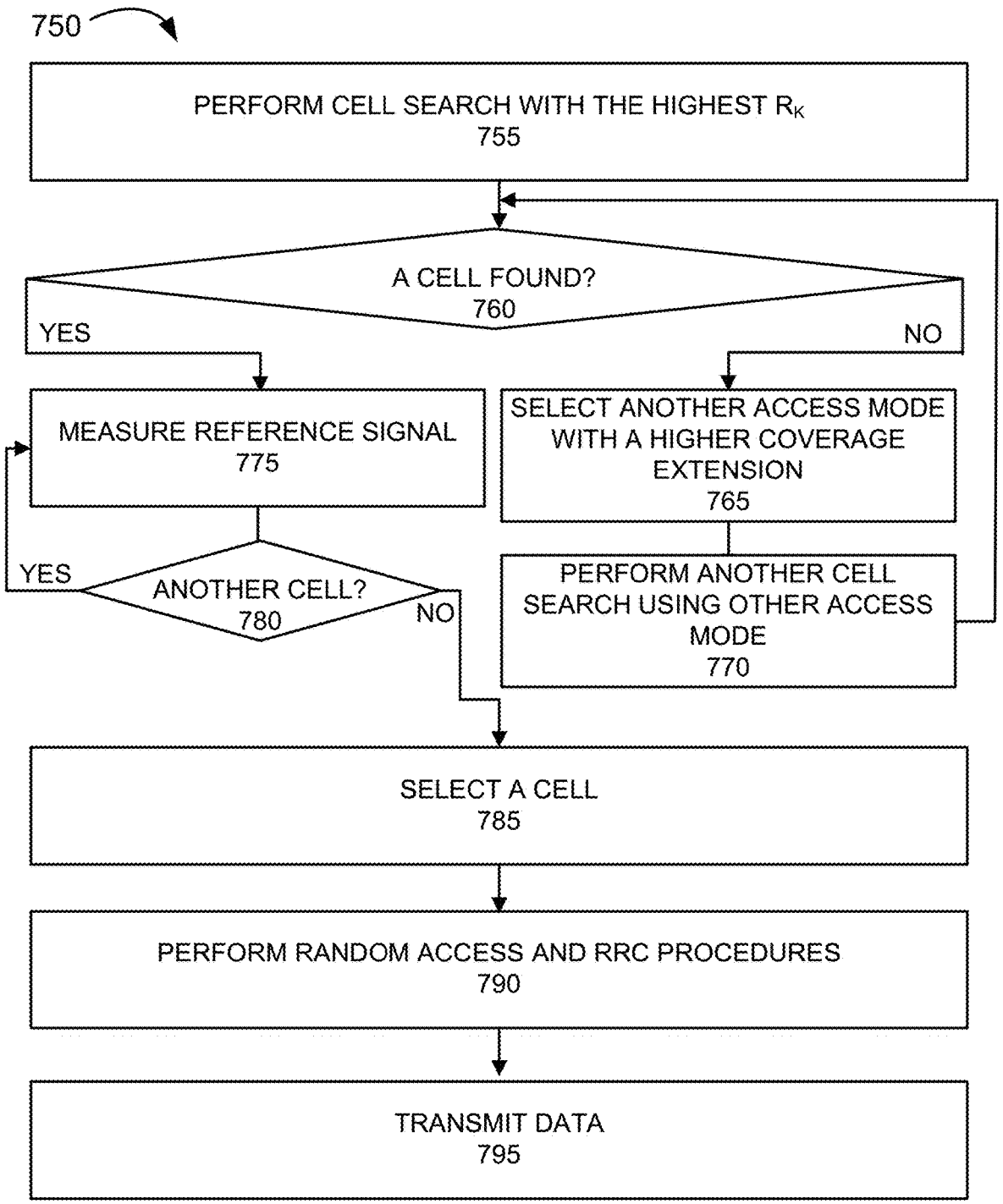
FIG. 7B is a flow diagram of another exemplary process of the access service performed by the end device.

FIG. 7B is a flow diagram illustrating an exemplary process 750 pertaining to the access service. Process 750 is directed to a process previously described with respect to FIGS. 6F and 6G, as well as elsewhere in this description, in which an order of priority for access modes is used for selecting a cell on which to camp. According to an exemplary embodiment, end device 160 performs steps of process 750. For example, processor 410 executes software 420 to perform the steps illustrated in FIG. 7B and described herein.

Referring to FIG. 7B, block 755, process 750 may begin with performing a cell search based on the access mode indicated by the highest access order value $R_k$. For example, end device 160 may search and/or scan for candidate cells based on a list. By way of further example, the list of candidate cells may be a most recently used (MRU) list, a public land mobile network (PLMN) list, a preferred roaming list (PRL), and so forth. The candidate cells may be on different bands, sub-bands, carrier frequencies, and/or channels. End device 160 may select frequency bands, sub-bands, carrier frequencies, and/or channels that correspond to the access mode having the highest access order value $R_k$. For example, eNB 210/cell 215 may support a particular access mode by way of certain frequency bands, sub-bands, carrier frequencies, and/or channels.

In block 760, it is determined whether a candidate cell is found. For example, end device 160 determines, during the cell search (e.g., scan), whether end device 160 is in receipt of a reference signal from one or multiple eNBs 210 that can be measured.

When it is determined that a candidate cell is not found (block 760—NO), then another access mode with a higher coverage extension is selected (block 765). For example, when end device 160 cannot successfully find the reference signal during the scanning/searching, end device 160 may select another access mode that offers a higher extension coverage. If there are multiple access modes available that offer a greater coverage extension, end device 160 may choose the access mode having the larger access order value $R_k$. In block 770, another cell search is performing based on the other access mode. Process 750 may continue to block 760.

When it is determined that a candidate cell is found (block 760—YES), a signal measurement is performed. For example, end device 160 measures the reference signal to produce an RSRP value and/or an RSSI value. End device 160 may also calculate other values based on the measured value (e.g., an RSRQ value, etc.). In block 780, it is determined whether another candidate cell is found. When another candidate cell is found (block 780—YES), process 750 continues to block 775. When another candidate cell is not found (block 780—NO), a cell is selected (block 785). For example, end device 160 selects the cell having the highest measured value and/or calculated value. When multiple candidate cells are found, end device 160 may compare the measured and/or calculated values of one cell to another cell.

In block 790, RA and RRC procedures are performed. For example, end device 160 may perform RA and RRC procedures to establish an RRC connection with eNB 210. In block 795, the data is transmitted. For example, end device 160 transmits data while operating in the access mode.

Although FIG. 7B illustrates an exemplary process 750 of the access service, according to other embodiments, process 750 may include additional operations, fewer operations, and/or different operations than those illustrated in FIG. 7B and described herein. For example, end device 160 may not transmit data. Additionally, or alternatively, depending on the scenario (e.g., handover, reestablish RRC, success of a procedure, etc.), end device 160 may perform other operations that have been omitted for sake of brevity.

According to still other exemplary embodiments, the access information may be provided to end devices using another RAT. For example, end device 160 may have multi-RAT capabilities in which the access information may be inherited from one of the RATs to which the end device 160 is currently connected or previously connected. End device 160 may calculate the access order value $R_k$, as described herein, based on the acquisition of the access information from another RAT.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, 7A, and 7B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

No element, act, or instruction described in the present application should be construed as critical or essential to the embodiments described herein unless explicitly described as such.

What is claimed is:

1. A method comprising:
    estimating, by a wireless station of a radio access network, a load for each radio access mode of multiple radio access modes of the wireless station, wherein the radio access modes include a first mode, a second mode, and one or more other modes;
    calculating, by the wireless station and in response to the estimating, a loading metric for each radio access mode based on its corresponding load;
    calculating, by the wireless station and in response to the calculating of the loading metric, an order of priority for each radio access mode by which end devices are to use to connect to the wireless station, based on the loading metric of each radio access mode, wherein each radio access mode has a different priority;
    generating, by the wireless station and in response to the calculating of the order of priority, a first message that includes the order of priority;
    broadcasting the first message, by the wireless station and in response to the generating, prior to receiving a request to establish an initial radio connection with one or more of the end devices; and
    receiving, by the wireless station subsequent to the broadcasting, one or more requests to establish one or more initial radio connections, from the one or more of the end devices, that are consistent with the order of priority.

2. The method of claim 1, wherein the calculating of the loading metric further comprises:
    calculating, by the wireless station, the loading metric based on the load and a corresponding target load.

3. The method of claim 1, wherein the first message is a System Information Block Type message, and wherein the first mode, the second mode, or the one or more other modes includes one of a Long Term Evolution mode, an enhanced Machine Type Communication (eMTC) mode A, an eMTC mode B, or a NarrowBand Internet of Things (NB-IoT) mode.

4. The method of claim 1, further comprising:
    recalculating, by the wireless station, the loading metric of each radio access mode subsequent to the broadcasting;
    determining, by the wireless station in response to the recalculating, whether the recalculated loading metric of one of the radio access modes is higher than a threshold; and
    determining, by the wireless station, whether the recalculated loading metric of another one of the radio access modes is lower than another threshold in response to determining that the recalculated loading metric of the one of the radio access modes is higher than the threshold.

5. The method of claim 4, further comprising:
    selecting, by the wireless station and in response to determining that the recalculated loading metric of the other one of the radio access modes is lower than the other threshold, one of the end devices connected to the wireless station using the one of the radio access modes;
    generating, by the wireless station and in response to the selecting, a second message that indicates another order of priority that the other one of the radio access modes is higher in priority than the one of the radio access modes; and
    unicasting the second message, by the wireless station and in response to the generating of the second message, to the one of the end devices.

6. The method of claim 1, further comprising:
    receiving, by an end device of the end devices, the first message;
    receiving, by the end device of the end devices, data to transmit;
    calculating for each radio access mode, by the end device of the end devices, a fitness value that indicates characteristics of the data;
    calculating for each radio access mode, by the end device of the end devices, a historical value that indicates a radio access mode history of the one of the end devices;
    calculating for each radio access mode, by the end device of the end devices, an order value based on the fitness value, the historical value, and the first message; and
    performing, by the end device of the end devices and in response to the calculating of the order value, a cell search based on the radio access mode associated with the order value that has a highest value.

7. The method of claim 6, further comprising:
    performing, by the end device of the end devices when the cell search is unsuccessful, another cell search based on another one of the radio access modes, wherein the other one of the radio access modes has a greater coverage extension relative to the radio access mode of the cell search.

8. The method of claim 1, wherein the load includes a current load pertaining to radio resources, and wherein calculating the loading metric further comprises:
    calculating, by the wireless station and in response to the estimating, the loading metric based on a required data rate for a specific user service and a data rate each radio access mode can support; and calculating, by the wireless station and in response to the estimating, the loading metric based on a required coverage for the specific user service and a coverage each radio access mode can support.

9. A system comprising:
a wireless station of a radio access network comprising:
   a first communication interface;
   a first memory, wherein the first memory stores first instructions; and
   a first processor, wherein the first processor executes the first instructions to:
      estimate a load for each radio access mode of multiple radio access modes of the wireless station, wherein the radio access modes include a first mode, a second mode, and one or more other modes;
      calculate a loading metric for each radio access mode based on its corresponding load in response to the estimation;
      calculate an order of priority for each radio access mode by which end devices are to use to connect to the wireless station, based on the loading metric of each radio access mode, wherein each radio access mode has a different priority;
      generate a first message that includes the order of priority in response to the calculation of the order of priority;
      broadcast the first message, via the first communication interface and in response to the generation, prior to receiving a request to establish an initial radio connection with one or more of the end devices; and
      receive, via the first communication interface subsequent to the broadcast, one or more requests to establish one or more initial radio connections, from the one or more of the end devices, that are consistent with the order of priority.

10. The system of claim 9, wherein when calculating the loading metric, the first processor further executes the first instructions to:
   calculate the loading metric based on the load and a corresponding target load.

11. The system of claim 9, wherein the first message is a System Information Block Type message, and wherein the first mode, the second mode, or the one or more other modes includes one of a Long Term Evolution mode, an enhanced Machine Type Communication (eMTC) mode A, an eMTC mode B, or a NarrowBand Internet of Things (NB-IoT) mode.

12. The system of claim 9, wherein the first processor further executes the first instructions to:
   recalculate the loading metric for each radio access mode subsequent to the broadcast;
   determine whether the recalculated loading metric of one of the radio access modes is higher than a threshold in response to the recalculation; and
   determine whether the recalculated loading metric of another one of the radio access modes is lower than another threshold in response to a determination that the recalculated loading metric of the one of the radio access modes is higher than the threshold.

13. The system of claim 9, wherein the first processor further executes the first instructions to:
   select one of the end devices connected to the wireless station using the one of the radio access modes in response to a determination that the recalculated loading metric of the other one of the radio access modes is lower than the other threshold;
   generate a second message, which indicates another order of priority that the other one of the radio access modes is higher in priority than the one of the radio access modes, in response to the selection; and
   unicast the second message, via the first communication interface and in response to the generation of the second message, to the one of the end devices.

14. The system of claim 9, further comprising:
an end device of the end devices comprising:
   a second communication interface;
   a second memory, wherein the second memory stores second instructions; and
   a second processor, wherein the second processor executes the second instructions to:
      receive, via the second communication interface, the first message;
      receive data to be transmitted;
      calculate for each radio access mode a fitness value that indicates characteristics of the data;
      calculate for each radio access mode a historical value that indicates a radio access mode history of the end device;
      calculate for each radio access mode an order value based on the fitness value, the historical value, and the first message; and
      perform, via the second communication interface and in response to the calculation of the order value, a cell search based on the radio access mode associated with the order value that has a highest value.

15. The system of claim 9, wherein the wireless station includes an evolved Node B, and wherein when calculating the loading metric, the first processor further executes the first instructions to:
   calculate the loading metric based on a required data rate for a specific user service and a data rate each radio access mode can support in response to the estimation; and
   calculate the loading metric based on a required coverage for the specific user service and a coverage each radio access mode can support in response to the estimation.

16. A non-transitory, computer-readable storage medium storing instructions executable by a processor of a computational device of a radio access network, which when executed cause the computational device to:
   estimate a load for each radio access mode of multiple radio access modes of a wireless station, wherein the radio access modes include a first mode, a second mode, and one or more other modes;
   calculate a loading metric for each radio access mode based on its corresponding load in response to the estimation;
   calculate an order of priority for each radio access mode by which end devices are to use to connect to the wireless station, based on the loading metric of each radio access mode, wherein each radio access mode has a different priority;
   generate a first message that includes the order of priority in response to the calculation of the order of priority;
   broadcast the first message within a cell of the wireless station in response to the generation, prior to receiving a request to establish an initial radio connection with one or more of the end devices; and receive, subsequent to the broadcast, one or more requests to establish one or more initial radio connections, from the one or more of the end devices, that are consistent with the order of priority.

17. The non-transitory, computer-readable storage medium of claim 16, wherein the first message is a System Information Block Type message, and wherein the first mode, the second mode, or the one or more other modes includes one of a Long Term Evolution mode, an enhanced Machine Type Communication (eMTC) mode A, an eMTC mode B, or a NarrowBand Internet of Things (NB-IoT) mode.

18. The non-transitory, computer-readable storage medium of claim 16, further storing instructions executable by the processor of the computational device, which when executed cause the computational device to:
 recalculate the loading metric of each radio access mode subsequent to the broadcast;
 determine, in response to the recalculation, whether the recalculated loading metric of one of the radio access modes is higher than a threshold; and
 determine whether the recalculated loading metric of another one of the radio access modes is lower than another threshold in response to a determination that the recalculated loading metric of the one of the radio access modes is higher than the threshold.

19. The non-transitory, computer-readable storage medium of claim 18, further storing instructions executable by the processor of the computational device, which when executed cause the computational device to:
 select one of the end devices connected to the wireless station using the one of the radio access modes in response to a determination that the recalculated loading metric of the other one of the radio access modes is lower than the other threshold;
 generate a second message that indicates another order of priority that the other one of the radio access modes is higher in priority than the one of the radio access modes in response to the selection; and
 unicast the second message, in response to the generation of the second message, to the one of the end devices.

20. The non-transitory, computer-readable storage medium of claim 16, wherein the load includes a current load pertaining to radio resources.

\* \* \* \* \*